US011042430B2

(12) United States Patent
Chen

(10) Patent No.: US 11,042,430 B2
(45) Date of Patent: Jun. 22, 2021

(54) ELASTIC CONSISTENCY HIGH AVAILABILITY IN MULTIPLE BOARDS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

(*) Notice: Subject to any disclaimer, the term of this patent is extended or adjusted under 35 U.S.C. 154(b) by 120 days.

(21) Appl. No.: 15/899,300

(22) Filed: Feb. 19, 2018

(65) Prior Publication Data

US 2018/0239667 A1    Aug. 23, 2018

Related U.S. Application Data

(60) Provisional application No. 62/461,434, filed on Feb. 21, 2017.

(51) Int. Cl.
*G06F 11/00* (2006.01)
*G06F 11/07* (2006.01)
(Continued)

(52) U.S. Cl.
CPC ........ *G06F 11/0754* (2013.01); *G06F 11/004* (2013.01); *G06F 11/0709* (2013.01);
(Continued)

(58) Field of Classification Search
CPC ............. G06F 11/0754; G06F 11/0709; G06F 11/0751; G06F 11/076; G06F 11/1443;
(Continued)

(56) References Cited

U.S. PATENT DOCUMENTS 6,934,305 B1 * 8/2005 Duschatko ............ H04L 45/583
370/503
7,111,053 B1   9/2006 Black et al.
(Continued)

FOREIGN PATENT DOCUMENTS

CN        101064668 A     10/2007
CN        101086709 A     12/2007
(Continued)

OTHER PUBLICATIONS

"International Application Serial No. PCT/CN2018/076983, International Search Report dated May 9, 2018", 4 pgs.
(Continued)

*Primary Examiner* — Anthony J Amoroso
(74) *Attorney, Agent, or Firm* — Schwegman, Lundberg & Woessner, P.A.

(57) ABSTRACT

A method of protecting against two or more board failures at the same time by providing an elastic consistency platform (ECP) of high availability (HA) in multiple board environments is described. The ECP is provided between transmission control protocol (TCP) and an application using TCP on each board, including providing input and output buffers to store data between a producer and a consumer. The ECP is used to generate a warning when an amount of data unsynchronized in an output buffer of the ECP on any board reaches a programmable limit.

20 Claims, 21 Drawing Sheets

(51) Int. Cl.
*H04L 12/24* (2006.01)
*H04L 29/06* (2006.01)
*H04L 29/14* (2006.01)
*H04L 12/26* (2006.01)

(52) U.S. Cl.
CPC ...... *H04L 41/0654* (2013.01); *H04L 41/0659* (2013.01); *H04L 69/16* (2013.01); *H04L 69/40* (2013.01); *G06F 2201/81* (2013.01); *H04L 43/0823* (2013.01)

(58) Field of Classification Search
CPC ............. G06F 11/1474; G06F 11/1608; G06F 11/1625; G06F 11/1629; G06F 11/1633; G06F 11/1637; G06F 11/1641; G06F 11/1645; G06F 11/165; G06F 11/3003; G06F 11/3031; G06F 11/3041; G06F 2201/81; G06F 13/00; G06F 13/42; H04L 41/0654; H04L 41/06; H04L 69/16; H04L 69/40; H04L 43/0823; H04L 45/28
USPC ................. 714/47.1, 47.2, 48; 370/216–221, 370/242–246, 248–250, 432, 503, 507; 707/654; 709/239, 242
See application file for complete search history.

(56) References Cited

U.S. PATENT DOCUMENTS 7,143,153 B1 * 11/2006 Black .................. H04L 41/0681
709/223
2003/0093557 A1   5/2003 Giraud et al.
2005/0141499 A1 * 6/2005 Ma ...................... H04L 41/0631
370/389
2008/0159325 A1 * 7/2008 Chen ...................... H04L 69/40
370/432
2011/0235503 A1 * 9/2011 Chen .................. H04L 41/0846
370/219

FOREIGN PATENT DOCUMENTS

| CN | 101237350 A | 8/2008 |
|---|---|---|
| CN | 101282281 A | 10/2008 |
| CN | 101573940 A | 11/2009 |
| CN | 102754383 A | 10/2012 |
| CN | 104144438 A | 11/2014 |

OTHER PUBLICATIONS

"International Application Serial No. PCT/CN2018/076983, Written Opinion dated May 9, 2018", 4 pgs.
"Chinese Application Serial No. 201880012723.X, Office Action dated Jun. 30, 2020", (w/ English Translation), 13 pgs.
Ren, Yongmao, et al., "An Interest Control Protocol for Named Data Networking Based on Explicit Feedback", IEEE, (2015), 199-200.
Zhou, Yun-Hua, et al., "Design and Implementation of a High-reliability Real-time Protocol Conversion Gateway in Scheduling System", (w/ English Abstract), Science Technology and Engineering, vol. 12, No. 23, (Aug. 2012), 5751-5756.

* cited by examiner

ELASTIC CONSISTENCY HIGH AVAILABILITY IN MULTIPLE BOARDS

RELATED APPLICATIONS

This application claims the benefit of priority under 35 U.S.C. § 119(e) to U.S. Provisional Patent Application Ser. No. 62/461,434, filed Feb. 21, 2017, which is incorporated herein by reference in its entirety.

TECHNICAL FIELD

The present disclosure relates generally to network communications, and more particularly to a system comprising various methods and constructs for providing an elastic consistency platform of high availability (HA) on multiple boards. Using this platform, no or minimum change to transmission control protocol (TCP) itself is needed for HA, and no or minimum change in an application using TCP is needed for HA.

BACKGROUND

Existing HA is built in TCP applications using TCP, and other modules on two control boards in a router. If two boards fail at the same time, the TCP fails in the router. Numerous changes for TCP HA are embedded into TCP and many changes in an application using TCP are needed for HA. These changes are complicated and may make the router unstable. In addition, the router cannot protect failures in two boards at the same time. In particular, the router does not determine whether there is a problem or bug in the router. However, some service providers are seeking protection against two failures such as two simultaneous board failures.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a system is provided including a primary board having circuitry for executing a primary application and a transmission control protocol (TCP) module, the primary board including a first elastic consistency platform (ECP) of high availability (HA) between the TCP module and the primary application using the TCP module, the first ECP including a first input buffer and a first output buffer; a secondary board having circuitry for executing a secondary copy of the primary application and a secondary TCP module, the secondary board including a second ECP of HA between the secondary TCP module and the secondary copy of the primary application, the second ECP including a second input buffer and a second output buffer; a third board having circuitry for executing a third copy of the primary application and a third TCP module, the third board including a third ECP of HA between the third TCP module and the third copy of the primary application, the third ECP including a third input buffer and a third output buffer; and a line card coupled to at least one of the primary board, the secondary board, and the third board. Each of the first ECP, the second ECP and the third ECP include one or more processors configured to generate a warning when an amount of data unsynchronized in any of the first output buffer, the second output buffer and the third output buffer reaches a programmable limit.

Optionally, in any of the preceding aspects, the first ECP on the primary board includes an HA method module configured to connect to the secondary board and the third board. Optionally, in any of the preceding aspects, the second ECP on the secondary board includes an HA method module configured to connect to the primary board and the third board. Optionally, in any of the preceding aspects, the third ECP on the third board includes an HA method module configured to connect to the primary board and the secondary board.

Optionally, in any of the preceding aspects, the first ECP on the primary board receives inputs from the second ECP on the secondary board and the third ECP on the third board, and wherein the first ECP on the primary board checks consistency among the inputs and generates a warning when an inconsistency is found. Optionally, in any of the preceding aspects, the second ECP on the secondary board receives inputs from the first ECP on the primary board and the third ECP on the third board, and wherein the second ECP on the secondary board checks consistency among the inputs and generates a warning when an inconsistency is found.

Optionally, in any of the preceding aspects, the third ECP on the third board receives inputs from the second ECP on the secondary board and the first ECP on the primary board, and wherein the third ECP on the third board checks consistency among the inputs and generates a warning when an inconsistency is found. Optionally, in any of the preceding aspects, at least one of the first ECP on the primary board, the second ECP on the secondary board, and the third ECP on the third board checks consistency by comparing a type of TCP data received in parallel from the at least one board and other boards. Optionally, in any of the preceding aspects, the at least one ECP is configured to generate a warning if the type of TCP data received from a board is not received from one of the other boards for a programmable time. Optionally, in any of the preceding aspects, the at least one ECP checks consistency by comparing sets of routes generated from an update type of TCP data received from the at least one board and other boards. Optionally, in any of the preceding aspects, the at least one ECP is configured to generate a warning if a route in the sets of routes generated from an update type of TCP data received from a board is not generated from the update type of TCP data received from one of the other boards for a programmable time. Optionally, in any of the preceding aspects, the first ECP on the primary board sends routes to a line card coupled to each of the primary board, the secondary board, and the third board.

According to one aspect of the present disclosure, a method of protecting against two or more board failures at the same time by providing an elastic consistency platform (ECP) of high availability (HA) in multiple board environments is provided. The method includes providing the ECP between transmission control protocol (TCP) and an application using TCP on each board, including providing input and output buffers to store data between a producer and a consumer, and using one or more processors of the ECP to generate a warning when an amount of data unsynchronized in an output buffer of the ECP on any board reaches a programmable limit.

Optionally, in any of the preceding aspects, the ECP on the primary board receives inputs from the ECP on the secondary board and the ECP on the third board, and wherein the ECP on the primary board checks consistency among the inputs and generates a warning when an inconsistency is found. Optionally, in any of the preceding aspects, the ECP on the secondary board receives inputs from the ECP on the primary board and the ECP on the third board, and wherein the ECP on the secondary board checks consistency among the inputs and generates a warning when an inconsistency is found. Optionally, in any of the preceding aspects, the ECP on the third board receives inputs from the ECP on the secondary board and the ECP on the primary board, and wherein the ECP on the third board checks consistency among the inputs and generates a warning when an inconsistency is found.

According to one aspect of the present disclosure, a method is provided including coupling a primary board having circuitry for executing a primary application and a transmission control protocol (TCP) module, a secondary board having circuitry for executing a secondary copy of the primary application and a secondary TCP module, a third board having circuitry for executing a third copy of the primary application and a third TCP module, and a line card in series to transfer data and acknowledgments between them sequentially via their respective TCP modules, providing an elastic consistency platform (ECP) of high availability (HA) between TCP and an application using TCP on each board, including providing input and output buffers to store data between a producer and a consumer, and using the ECP to generate a warning when an amount of data unsynchronized in an output buffer of the ECP on any board reaches a programmable limit.

Optionally, in any of the preceding aspects, the ECP on the primary board includes an HA method module configured to connect to the secondary board. Optionally, in any of the preceding aspects, the ECP on the secondary board includes an HA method module configured to connect to the primary board and the third board. Optionally, in any of the preceding aspects, the ECP on the third board includes an HA method module configured to connect to the secondary board.

This Summary is an overview of some of the teachings of the present application and is not intended to be an exclusive or exhaustive treatment of the present subject matter. Further details about the present subject matter are found in the detailed description and appended claims. The scope of the present subject matter is defined by the appended claims and their legal equivalents.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limited sense, and the scope of the present disclosure is defined by the appended claims.

HA is a characteristic of a system to ensure a level of operational performance for a higher than normal time period. The present inventive subject matter proposes a platform of HA, referred to herein as ECP. Using this platform, no change or minimum change to TCP itself is needed for HA, and no change or minimum change in an application using TCP is needed for HA. In addition, it provides protection against two and more simultaneous board failures in the router. Further, it can determine whether there is a problem or bug in the router.

Figure 1:
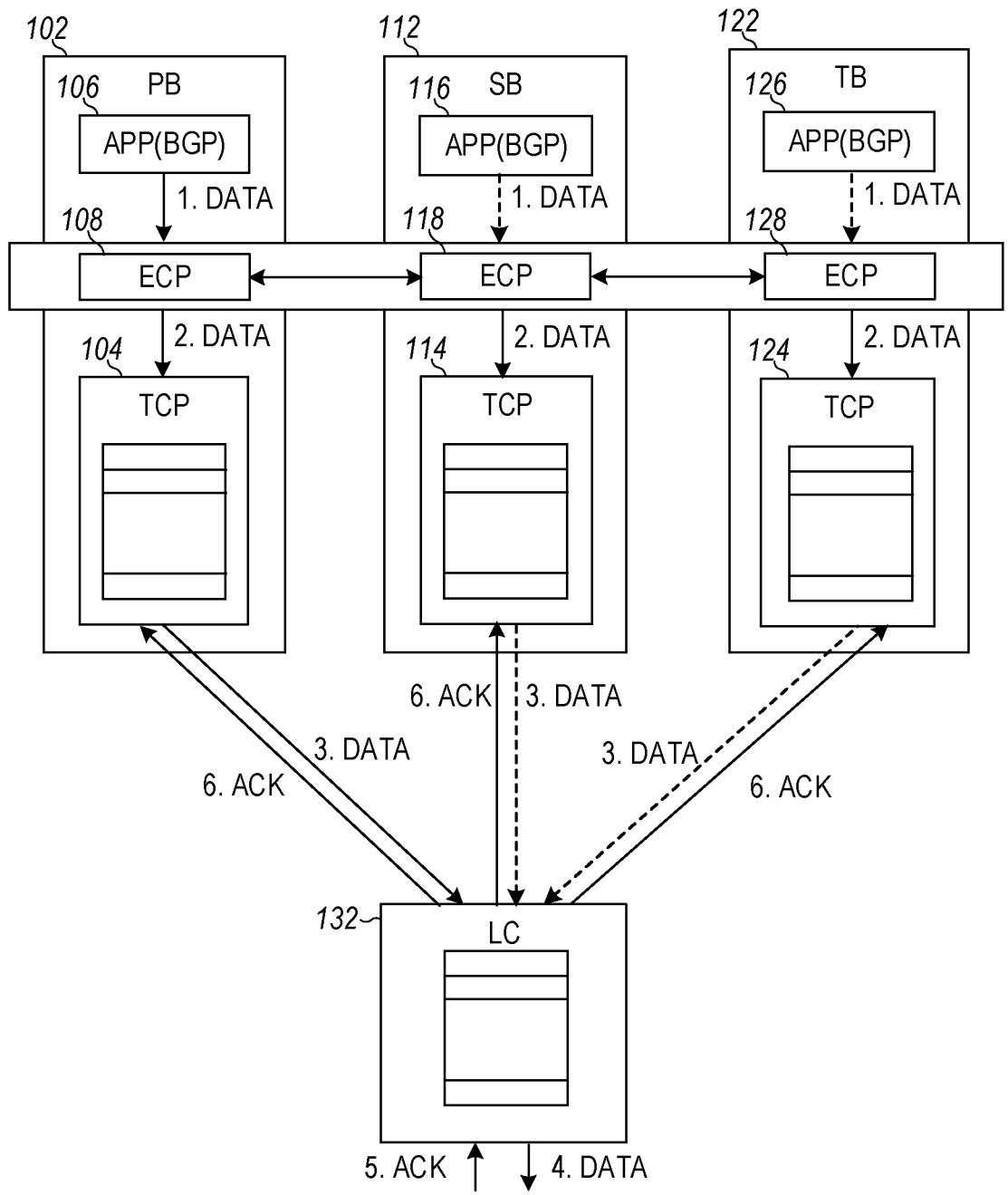
FIG. 1 is a block diagram of a system for an elastic consistency platform for high availability, according to various embodiments.

FIG. 1 is a block diagram of a system for an elastic consistency platform for high availability, according to various embodiments. In various embodiments, there are at least three control boards, Primary Board (PB) 102, Secondary Board (SB) 112 and Third Board (TB) 122, in a router or device. These boards are also referred to as network elements (NEs), wherein PB equates to NE1, SB equates to NE2, and TB equates to NE3. Such multiple NEs may be referred to as a cluster of NEs. There may be n NEs in various embodiments, with n greater than 2. The NEs may be boards, nodes, or virtual machine (VM) containers in different embodiments for a router. A TCP module 104, 114, 124 runs on each of these boards or network elements. An application 106, 116, 126 (or a number of applications) such as BGP uses TCP on each of the boards, in various embodiments. Each board is connected to a Line Card (LC) 132 or a number of LCs in various embodiments. In various embodiments, each line card 132 is connected to a peer or neighbor router or device. In the present subject matter, an elastic consistency platform (ECP) 108, 118, 128 of HA is built between TCP module 104, 114, 124 and an application 106, 116, 126 using TCP on each board.

Figure 2:
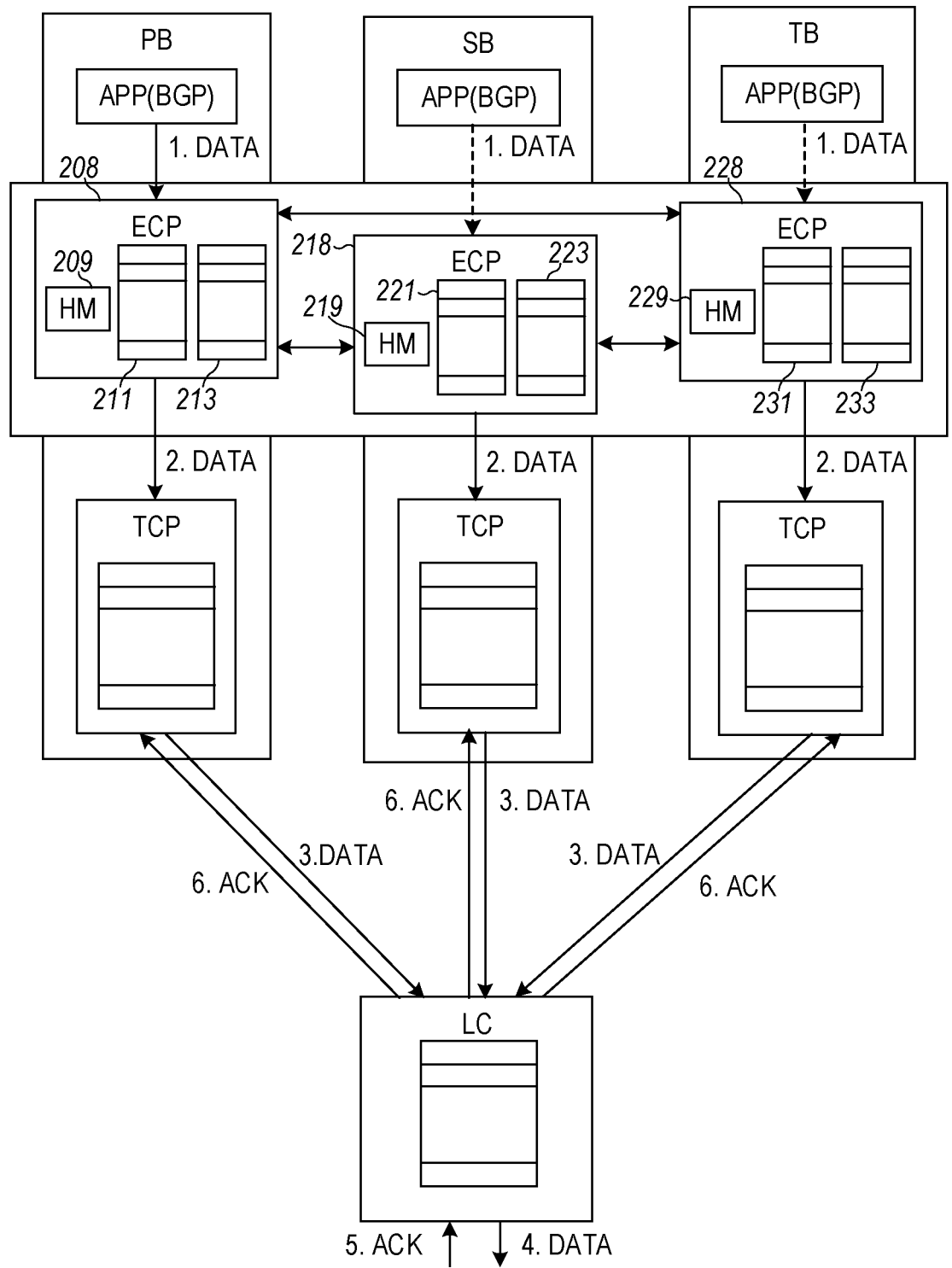
FIG. 2 is a block diagram illustrating architecture for an elastic consistency platform for high availability, according to various embodiments.

FIG. 2 is a block diagram illustrating architecture for an elastic consistency platform (ECP) for high availability, according to various embodiments. In various embodiments, the ECP 208, 218, 228 includes a HA method (HM) module 209, 219, 229, in which different TCP HA methods and different application HA methods can be implemented. Thus, no or minimum change is needed in TCP and the application using TCP for HA. In general, a platform of HA is used between a producer (e.g., BGP) and a consumer (e.g., TCP). In various embodiments, the platform comprises an incoming/input buffer 211, 221, 231 and outgoing/output buffer 213, 223, 233. The former stores data from the producer to consumer (e.g., outgoing TCP data from BGP to TCP), and the latter stores data from the consumer as producer to the producer as consumer (e.g., incoming TCP data from TCP to BGP). The platforms on all the boards are connected according to a HA method, in various embodiments. In various embodiments, the HA method consists of a function for determining whether there is a problem or bug in a producer through processing and analyzing the data from the producer.

No or minimum change in a module (e.g., BGP and RIB) as a producer is needed for HA when the platform is used, in various embodiments. No or minimum change in a module (e.g., RIB and FIB) as a consumer is needed for HA when the platform is used, in an embodiment. In the present subject matter, the HA implemented using the platform provides protections against two and more failures such as two or more simultaneous board failures in a simple and efficient way, and determination of a problem or bug in a module is included in the HA implemented using the platform. The HA implementation in an application using TCP is independent of TCP implementations, and the HA using the platform is flexible and easy for adopting different TCP and application HA methods.

In various embodiments, primary, secondary, and third board is determined by configuration or automatically according to rules. Each board knows the determination, which may be synchronized among all boards. According to various embodiments, the ECP includes an HM (HA Method) module, an incoming TCP data buffer, and an outgoing TCP data buffer. ECPs on different boards are connected, send/receive data and acknowledge (ack) for data to/from other ECPs according to a HA method/rule. Connections among ECPs can be any transport among boards such as transparent inter-process communication protocol (TIPC) or TCP, in various embodiments. According to various embodiments, TCP on each board in the system is not aware of TCP HA. For outgoing TCP data to a peer, only one TCP data stream (from PB) is used and is continuous after switching over to SB/TB when PB/SB fails. In one embodiment, only TCP on PB sends data to LC from an application (e.g., BGP), and TCP on each of the other boards (e.g., SB and TB) discards data when sending data to the LC. The LC still sends Ack from peer to TCP on every board (e.g., PB, SB and TB), in various embodiments. In one embodiment, TCP on every board sends data to the LC, and the LC selects the data from TCP on PB and sends the data to a peer. If there are multiple LCs for redundancy, only the primary LC sends data to the peer, and the others discard data when the primary LC reaches to send the data, in this embodiment.

Figure 3:
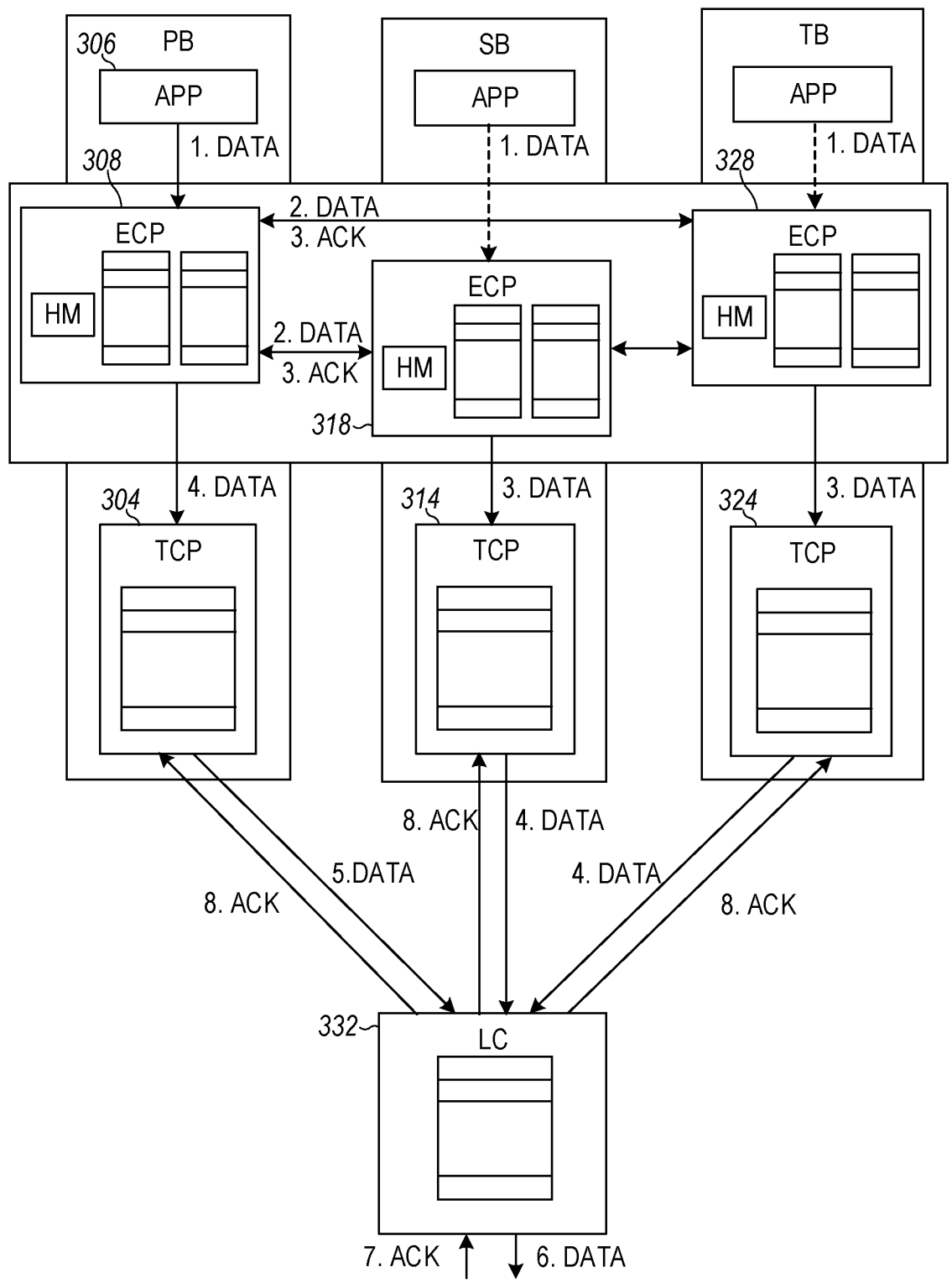
FIG. 3 is a block diagram illustrating outgoing transmission control protocol (TCP) traffic in parallel in a system for an elastic consistency platform for high availability, according to various embodiments.

FIG. 3 is a block diagram illustrating outgoing transmission control protocol (TCP) traffic in parallel in a system for an elastic consistency platform for high availability, according to various embodiments. In various embodiments, ECP on PB 308 receives TCP data (Pd) from an application 306 such as BGP, concurrently sends Pd to ECP on each of the other boards 318, 328 such as SB and TB, and sends Pd to its TCP 304 and then to peer via LC 332 after receiving an Ack for receiving Pd from ECP on each of the other boards 318, 328. According to various embodiments, ECP on any board (AB) other than PB (e.g., SB) receives data Pd from ECP on PB 308, and sends an Ack for receiving Pd to ECP on PB 308 and Pd to its TCP 314, 324. If Ad is received before Pd by ECP on AB, it is stored in an output buffer, and then is removed from the buffer after Pd is received. If Pd is received before Ad, Pd is stored in the buffer, and then is removed from the buffer after Ad is received.

When ECP on AB tries to send Pd to TCP and Ack to ECP on PB, it can send in parallel an Ack to ECP on PB and Pd to its TCP after receiving Pd, or it can send in strict order Pd to its TCP and Ack to ECP on PB after receiving data Ad=Pd from corresponding application on AB. In various embodiments, a warning is generated when the amount of data unsynchronized in output buffer of ECP on AB reaches a given value/limit. All data Pd and Ad received may be sent for analysis, in an embodiment. TCP on every board (e.g., PB) sends LC data Pd it receives and stores in its output buffer, and then removes data Pd from its buffer after receiving an Ack for the data from LC, in an embodiment. LC receives data Pd from TCP on every board, stores data Pd in its output buffer, and sends it to a peer after receiving it from TCP on PB. The data from TCP on a different board may be stored in a different output buffer. All the data from TCP on every board and all the data from a peer may be transferred for analysis, in an embodiment. LC receives an Ack for the data from a peer and sends the Ack to TCP on every board, in an embodiment. LC may check the consistency of data from TCP on every board (e.g., PB, SB, and TB). In various embodiments, a warning is generated when the amount of inconsistent data in its output buffer reaches a prescribed value/limit.

In one example, outgoing TCP traffic is processed in parallel by the present system. ECP on PB receives TCP data Pd from an application and stores it in its output buffer, and sends data Pd to ECP on each of the other boards such as SB and TB. In various embodiments, ECP on SB receives data Pd from ECP on PB after receiving corresponding data Sd from application on SB and storing Sd in its output buffer. In various embodiments, ECP on SB sends an Ack to ECP on PB after receiving Pd from ECP on PB. If Sd is in its buffer and equals Pd, ECP on SB sends data Pd to its TCP and removes Sd from its buffer. In various embodiments, ECP on TB receives data Pd from ECP on PB before receiving corresponding data Td from application on TB. ECP on TB stores Pd in its output buffer, sends an Ack to ECP on PB, and sends Pd to its TCP, in an embodiment. When ECP on TB receives Td equal to Pd, it removes Pd from its buffer. In various embodiments, TCP on each of the other boards (SB and TB) sends data Pd to LC after receiving Pd from its ECP. ECP on PB then sends data Pd to its TCP and removes Pd from its buffer after receiving Ack from ECP on each of the other boards. In this embodiment, LC receives data Pd from TCP on each of the other boards (i.e., SB and TB), and stores data in its output buffer. TCP on PB then sends data Pd to LC after receiving it from ECP on PB. The LC receives data Pd from TCP on PB, stores Pd in its output buffer, and sends data Pd from TCP on PB to peer. The LC receives Ack for the data from peer and sends Ack to TCP on every board, which removes data from its output buffer, in an embodiment.

In general, the data streams from TCPs on all boards to LC are the same. Thus, it is straightforward for LC to check if the data streams are consistent. Starting from a common point of the data streams stored in the output buffers, the data after that point in different buffers should be the same byte by byte, according to various embodiments. If some data in the output buffer for a data stream is different from the data in the output buffer for another data stream, a problem/bug warning is issued. In various embodiments, if a data stream from a TCP is behind others for a given limit, a warning is issued.

In various embodiments, a consistency check is performed on outgoing TCP traffic in parallel. ECP on any board AB (e.g., PB, SB, TB) receives TCP traffic/data from BGP on AB and some of the other boards. This ECP checks the consistency of the data based on the types of data. According to various embodiments, there are four types of TCP data from BGP: 1) Open, 2) Update, 3) Notification and 4) Keep alive. An Open message/data from BGP on a board is consistent with the same Open message/data from BGP on another board. An Update message/data from BGP on a board is consistent with another Update message/data from BGP on another board if they generate the same routes. Since the updates from BGP on a board may not be in the same order or in the same time as the updates from BGP on another board, the consistency between two sets of updates is determined by the two sets of routes generated by the two sets of updates. If the two sets of routes are the same, then they are consistent; otherwise, they are not and it is highly likely that there is a problem or bug in BGP. In various embodiments, a Notification message/data from BGP on a board is consistent with the same Notification message/data from BGP on another board. A Keep alive message/data from BGP on a board is consistent with another Keep alive message/data from BGP on another board, and is also consistent with an Update message/data from BGP on another board, in various embodiments.

The present subject matter provides algorithms for checking the consistency of Update message/data. In various embodiments, an algorithm in ECP on a board for checking consistency of (route) Updates from BGPs on boards is provided. In one embodiment, a tree named RTree is used for storing information on each of the routes temporally, and is initially empty. An Update may contain the information/instruction for withdrawing/deleting one or more routes, and adding/updating one or more routes. In the present embodiment, an Update contains the information/instruction for withdrawing/deleting one route or adding/update one route. For multiple routes deletion or addition/update, the present algorithm may be called multiple times. For a route with destination (Dr), one item with Dr as key is stored in RTree and contains a time To and information/structure on a route for updates from each of BGPs on boards. In various embodiments, time To is the oldest time when a route update is applied on the item, and is unset initially. The structure comprises a status Sx (e.g., Sx is Sp/Ss/St for the route from PB/SB/TB respectively) for the route, a time Tx (e.g., Tx is Tp/Ts/Tt for the route from PB/SB/TB respectively), and the contents of the route. The status may have a value of Active, Deleted, or None, which indicates the route is active, deleted, or none (empty) respectively. The status Sx (e.g., Sp, Ss, and St) is set to None when the item is initialized. The contents includes the next hop (NHx) to the destination Dr, and the time Tx is the time when the last route update from BGP on a board xB is applied on the route, in an embodiment.

In various embodiments, an example of an item for a route with destination Dr is provided. The item contains To and three columns, each of which stores the information (e.g., Sp, Tp, NHp) on the route derived from the route updates from the BGP on each of the boards (e.g., PB, SB, and TB). The first column Sp, Tp, NHp, stores the information on the route derived from the route updates from the BGP on PB. The second column Ss, Ts, NHs stores the information on the route derived from the route updates from the BGP on SB. The third column St, Tt, NHt stores the information on the route derived from the route updates from the BGP on TB.

| Dr | | |
|---|---|---|
| To | | |
| Sp | Ss | St |
| Tp | Ts | Tt |
| NHp | NHs | NHt |

Figure 4:
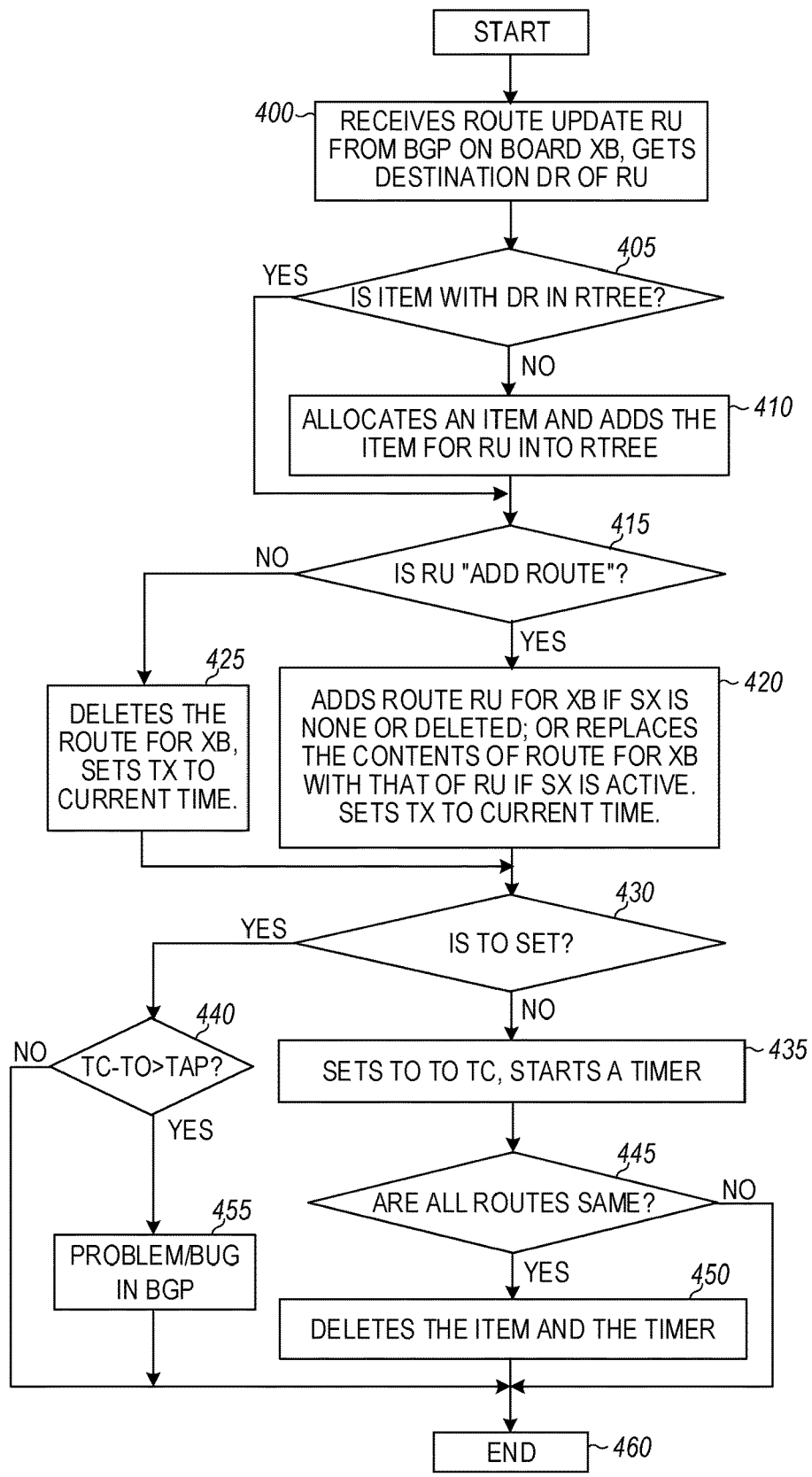
FIG. 4 is a flow diagram of a method for outgoing transmission control protocol traffic in parallel, according to various embodiments.

FIG. 4 is a flow diagram of a method for outgoing transmission control protocol traffic in parallel, according to various embodiments. The method starts at block 400, which receives a route update (Ru) from BGP on a board xB (e.g., xB is PB, SB or TB), and gets the destination Dr of Ru. At block 405, the method determines if an item with Dr is in the RTree. If it is not, the method goes to block 410; if it is, the method goes to block 415. At block 410, the method allocates an item with Dr, initializes it, adds it into RTree and then goes to block 415. At block 415, the method determines if Ru is "add route". If it is, the method goes to block 420; if it is not (Ru is "delete route"), the method goes to block 425. At block 420, the method adds route R in Ru for xB (xB is PB, SB or TB) if Sx (Sx is Sp, Ss or St) is none or deleted; or replaces the contents of the route for xB in the item with the contents of Ru if Sx is active. The method sets Tx (Tx is Tp, Ts or Tt) to current time, Sx to active, and then goes to block 430. At block 425, the method deletes the route for xB (xB is PB, SB or TB), sets Tx to the current time, Sx to deleted, and then goes to block 430. At block 430, the method determines if To is set: if it is not, the method goes to block 435; if it is, the method goes to block 440. At block 435, the method sets To to current time (Tc), starts a timer with a given time period Tap (e.g., 10 seconds) and a call back function for reporting a problem/bug in BGP, and goes to block 445. At block 440, the method checks if the difference between Tc (current time) and To is greater than Tap. If it is, the method goes to block 455. If it is not, the method goes to block 460. At block 445, the method checks if all routes in the item are the same. If they are, the method goes to block 450; if they are not, the method goes to block 460. At block 450, the method deletes the item from RTree and the timer, then goes to block 460. At block 455, the method reports a problem/bug in BGP, and goes to block 460, where the method ends.

Figure 5:
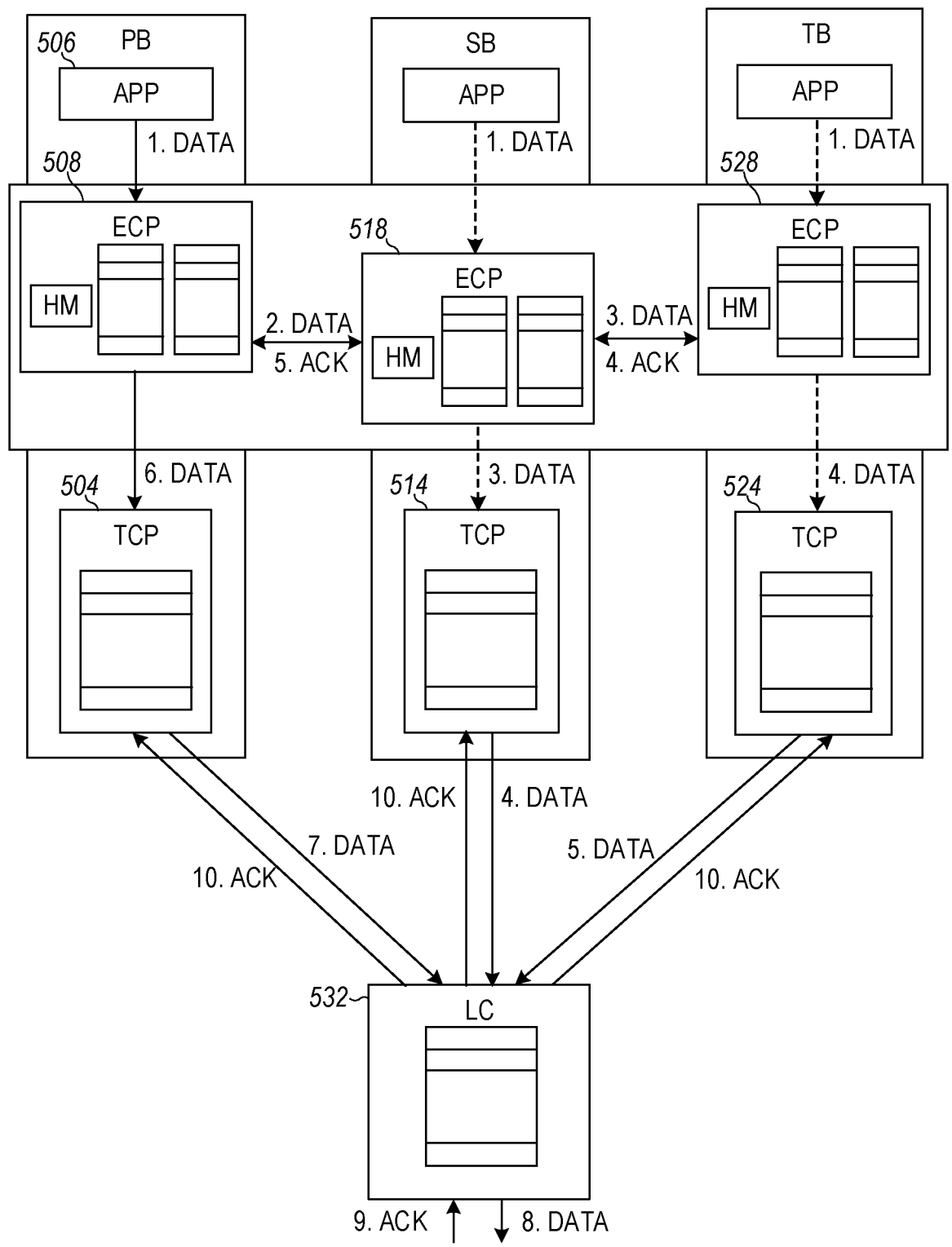
FIG. 5 is a block diagram illustrating outgoing transmission control protocol traffic in sequential in a system for an elastic consistency platform for high availability, according to various embodiments.

FIG. 5 is a block diagram illustrating outgoing transmission control protocol traffic in sequential in a system for an elastic consistency platform for high availability, according to various embodiments. ECP on PB 508 receives TCP data from an application 506, sends the data to ECP on its next board SB 518, and sends the data to TCP 504 on PB after receiving the Ack for the data from ECP on SB 518, according to various embodiments. In various embodiments, ECP on SB 518 receives the data from ECP on PB 508, sends the data to its TCP 514 on SB and ECP on the next board 528 (e.g., TB), and sends an Ack for receiving the data to ECP on PB 508 after receiving the Ack from ECP on the next board (TB) 528. In this embodiment, ECP on the last board (TB) 528 receives the data from ECP on the previous board (SB) 518, sends the data to its TCP 524 on TB and sends an Ack to ECP on the previous board (SB) 518. TCP 504, 514, 524 on every board sends the data to LC 532 after receiving the data from its ECP, and removes the data from its output buffer after receiving the Ack for the data from LC 532. LC 532 receives the data from TCP 504, 514, 524 on every board, stores the data in its output buffer, and sends the data to a peer. One option is that the data to be sent to peer is the data from TCP 504 on PB. Another option is that the data to be sent to peer is the data from all TCP (i.e., LC 532 sends the data to peer after it receives the data from all TCPs). LC 532 receives an Ack for the data from a peer and sends the Ack to TCP on every board, which removes the data from its output buffer.

Figure 6:
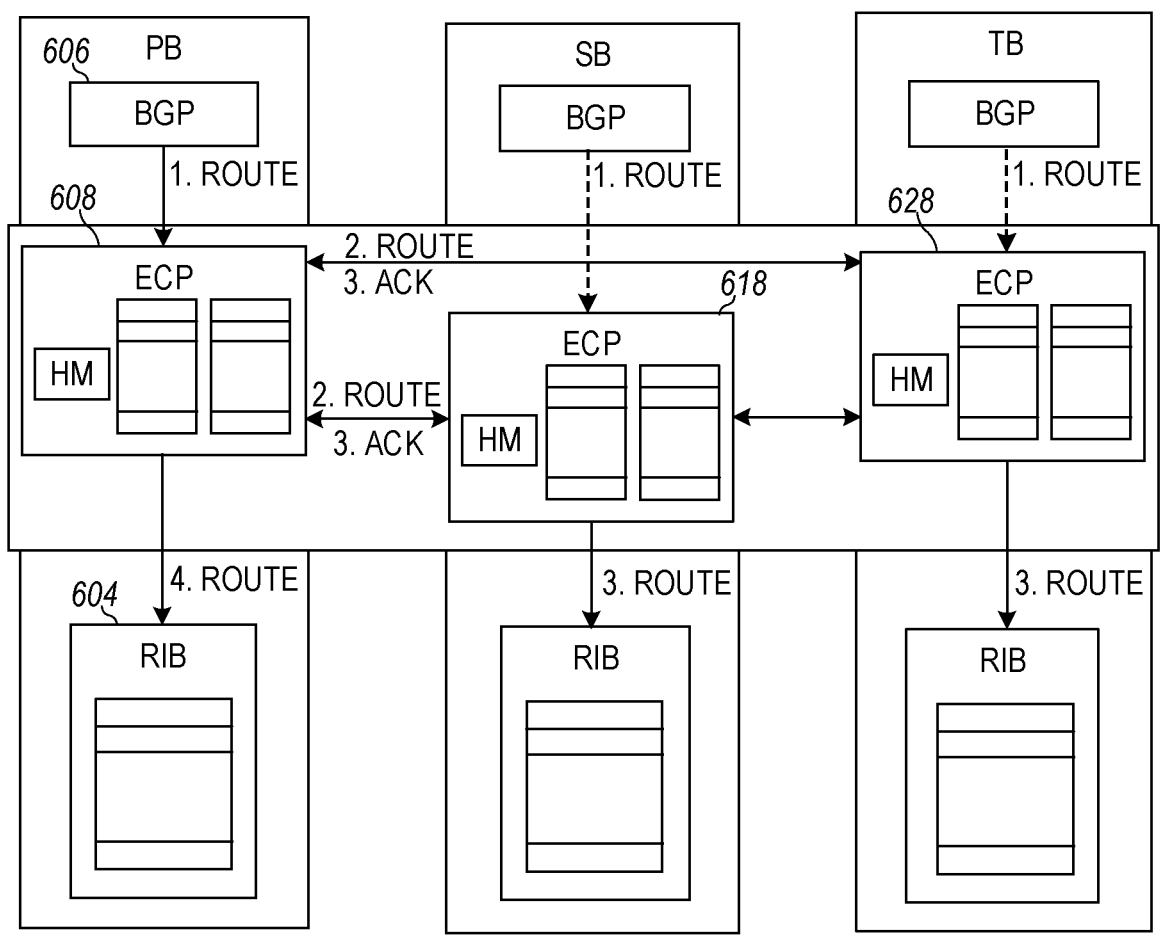
FIG. 6 is a block diagram illustrating border gateway protocol (BGP) to routing information base (RIB) route synchronization in a system for an elastic consistency platform for high availability, according to various embodiments.

FIG. 6 is a block diagram illustrating border gateway protocol (BGP) to routing information base (RIB) route synchronization in a system for an elastic consistency platform for high availability, according to various embodiments. In various embodiments, ECP on PB 608 receives BGP route Prt from BGP 606, and concurrently sends Prt to ECP on each of the other boards 618, 628 such as SB and TB, and sends Prt to its RIB 604 after receiving an Ack for receiving Prt from ECP 618, 628 on each of the other boards. ECP on any board AB other than PB (e.g., SB) receives route Prt from ECP on PB 608, sends an Ack for receiving Prt to ECP on PB 608 and Prt to its RIB 604. If route Art corresponding to Prt from BGP on AB is received before Prt by ECP on AB, it is stored in an output buffer, and then is removed from the buffer after Prt is received. If Prt is received before Art, Prt is stored in the buffer, and then is removed from the buffer after Art is received. In various embodiments, ECP on AB can send Prt to RIB and Ack to ECP on PB either in parallel or in strict order, and can generate a problem/bug warning when the amount of route unsynchronized in output buffer of ECP 618, 628 on AB reaches a given value/limit and/or time. In various embodiments, all route Prt and Art received can be sent for analysis.

In various embodiments of a route, there is a set of operations or updates. Each set includes the route updates from the BGP on one board (e.g., PB). If there are three boards PB, SB, and TB, there may be three sets of operations or updates, each of which is from the BGP on one board. One set of operations on the route will generate the same result (or, e.g., final route) as another set of operations on the route. Thus, each set of operations on the route will generate the same result (final route) when the network is stable or converged. If the result generated from the operations on the route from BGP on one board is different from the result generated from the operations on the route from BGP on another board for a period of time, then an inconsistency is found and it is highly possible that there is a problem or bug in BGP. In one example for a route R, which is from BGP and to be stored in RIB, one item for R may be created and stored in a table, tree, or database by ECP on a board. This item may be identified by its destination Dr, in an embodiment. Under Dr, there are a few routes, each of which is the result of the operations/updates on the route from the BGP on one board and associated with a time which is the time when the last update is applied on the route. If the results are the same within a given time, then they are consistent and the item may be removed; otherwise, an inconsistency is found and it is highly probable that there is a problem or bug in BGP.

For example, suppose that ECP on PB receives BGP route updates from BGP on every board PB, SB, and TB. In this case, there are three sets of route updates: SP (set of route updates from BGP on PB), SS (set of route updates from BGP on SB), and ST (set of route updates from BGP on TB). For the route R with destination Dr, under the item identified by Dr, there are three routes Rp, Rs, and Rt which are the results of route updates applied on the route from the BGP on PB, SB and TB respectively. If Rp with time Tp, Rs with Ts, and Rt with Tt cannot reach a same result for a given time limit (i.e., at time T of checking, the maximum of (T−Tp), (T−Ts) and T−Tt) is greater than the given time limit), then an inconsistency is found; otherwise (they reach the same result within a given time), they are consistent and the item may be removed.

Various embodiments provide an algorithm in ECP on a board for checking consistency of routes from BGPs on boards. For this embodiment, assume that a tree named RTree is used for storing information on each of the routes temporally, and that initially it is empty. For a route with destination Dr, one item with Dr as a key is stored in RTree and contains a time To and information/structure on a route for updates from each of BGPs on the boards. Time To is the oldest time when a route update is applied on the item, and is unset initially, in an embodiment. The structure comprises a status Sx (e.g., Sx is Sp/Ss/St for the route from PB/SB/TB respectively) for the route, a time Tx (e.g., Tx is Tp/Ts/Tt for the route from PB/SB/TB respectively), and the contents of the route. The status may have a value of active, deleted, or none, which indicates the route is active, deleted, or none (empty) respectively. The status Sx (e.g., Sp, Ss and St) is set to none when the item is initialized, and the contents include the next hop (NHx) to the destination Dr. The time Tx is the time when the last route update from BGP on a board xB is applied on the route, in an embodiment.

Figure 7:
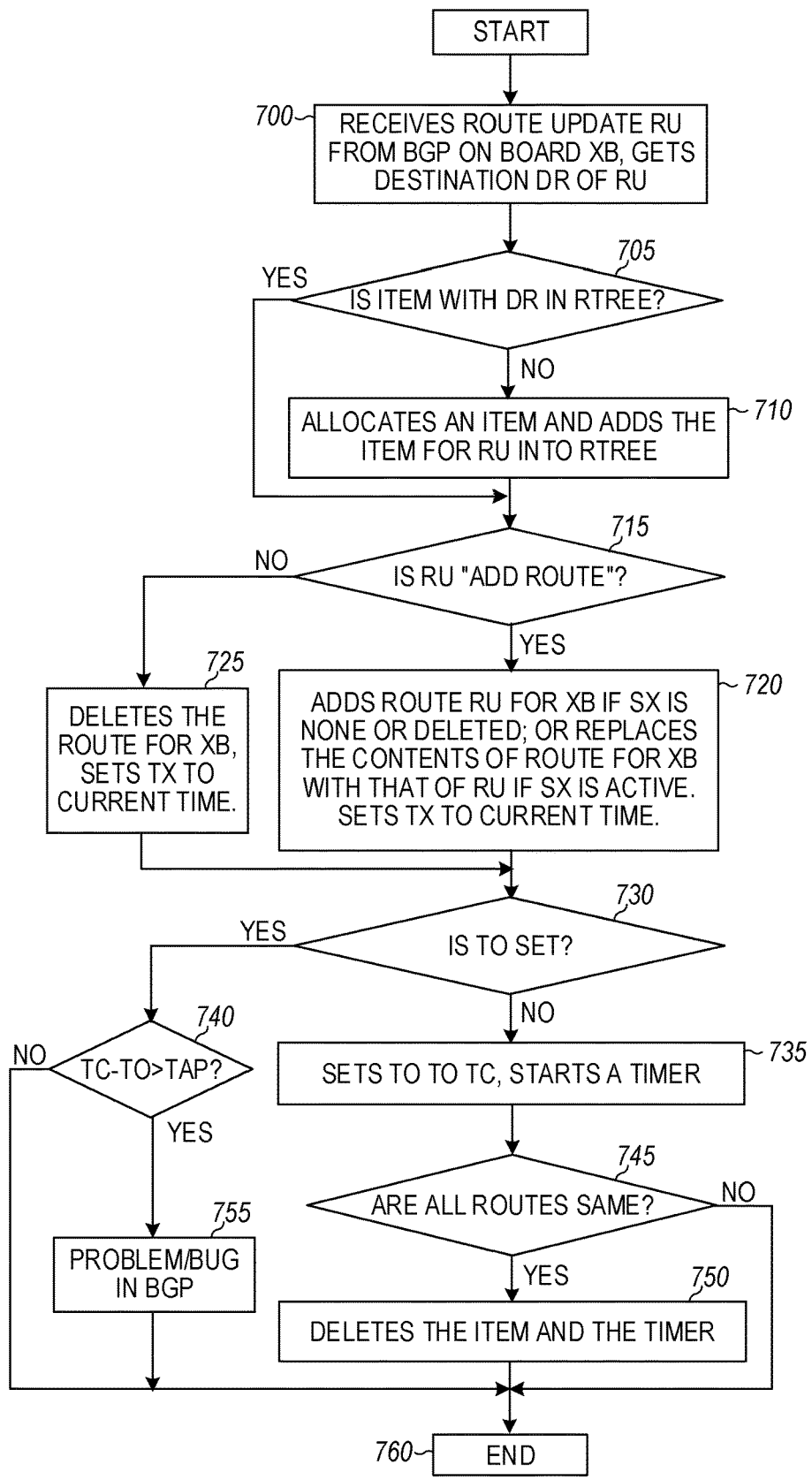
FIG. 7 is a flow diagram illustrating border gateway protocol (BGP) to routing information base (RIB) route synchronization, according to various embodiments.

FIG. 7 is a flow diagram illustrating border gateway protocol (BGP) to routing information base (RIB) route synchronization, according to various embodiments. The method starts at block 700, which receives a route update Ru from BGP on a board xB (e.g., xB is PB, SB, or TB), gets the destination Dr of Ru, and then goes to block 705. At block 705, the method determines if an item with Dr is in the RTree. If it is not, the method goes to block 710; if it is, the method goes to block 715. At block 710, the method allocates an item, initializes it, adds it into RTree and then goes to block 715. At block 715, the method determines if Ru is "add route". If it is, the method goes to block 720; if it is not (Ru is "delete route"), the method goes to block 725. At block 720, the method adds route R in Ru for xB (xB is PB, SB, or TB) if Sx, (Sx, is Sp, Ss, or St) is none or deleted; or replaces the contents of the route for xB in the item with the contents of Ru if Sx is active. The method sets Tx (Tx is Tp, Ts, or Tt) to current time, Sx to active, and then goes to block 730. At block 725, the method deletes the route for xB (xB is PB, SB, or TB), sets Tx to the current time, sets Sx to deleted, and then goes to block 730. At block 730, the method determines if To is set. If it is not, the method goes to block 735; if it is, the method goes to block 740. At block 735, the method sets To to current time (Tc), starts a timer with a given time period Tap (e.g., 20 seconds) and a call back function for reporting a problem/bug in BGP, and then goes to block 745. At block 740, the method checks if the difference between Tc (current time) and To is greater than Tap, and if it is, the method goes to block 755. If it is not, the method goes to block 760. At block 745, the method checks if all routes in the item are the same. If they are, the method goes to block 750. If they are not, the method goes to block 760. At block 750, the method deletes the item from RTree and the timer, then goes to block 760. At block 755, the method reports a problem/bug in BGP, and goes to block 760, where the method ends.

Figure 8:
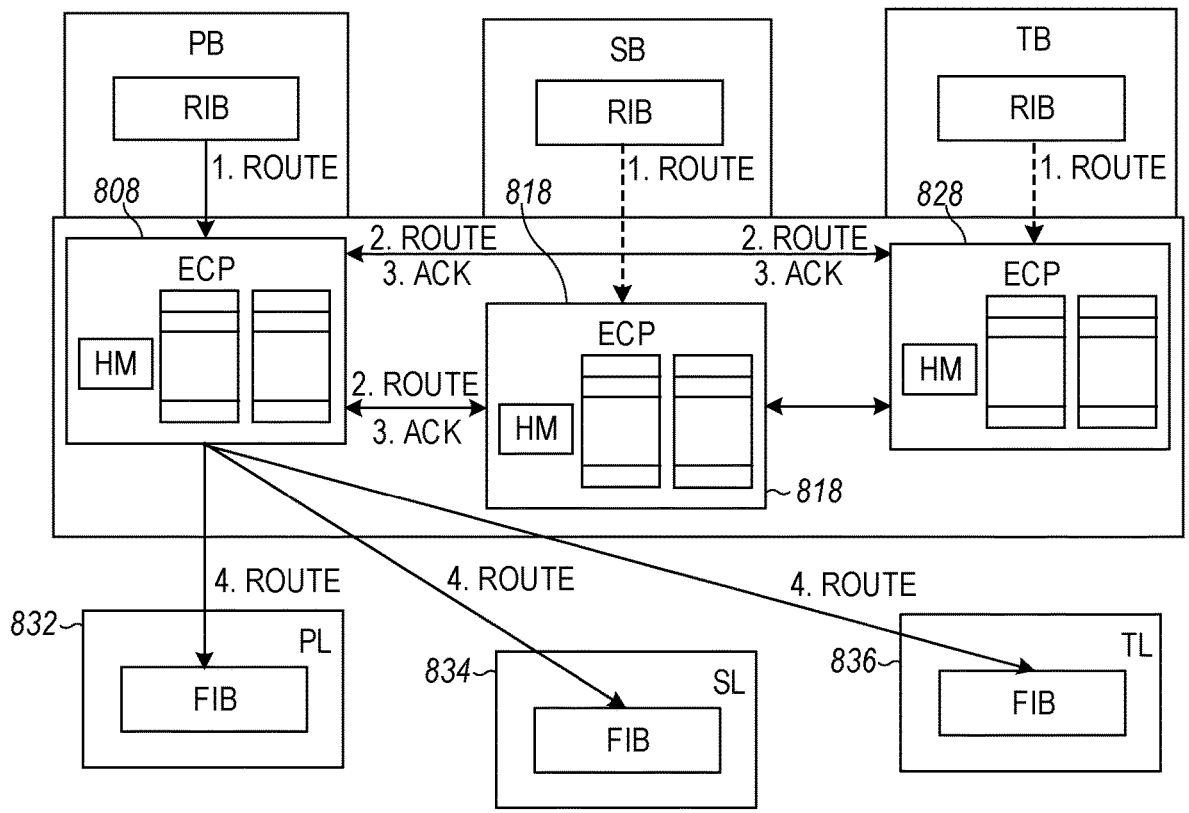
FIG. 8 is a block diagram illustrating routing information base (RIB) to forwarding information base (FIB) route synchronization in a system for an elastic consistency platform for high availability, according to various embodiments.

FIG. 8 is a block diagram illustrating routing information base (RIB) to forwarding information base (FIB) route synchronization in a system for an elastic consistency platform for high availability, according to various embodiments. Before sending routes to FIBs, routes from RIBs can be synchronized in a way similar to (or the same as) that described above for BGP routes synchronization. Thus, they can be synchronized in one of three ways: PB to Others, PB to Others and Vice Versa (or PB and Others Exchange), and Full Mess Exchange. In various embodiments, there are different approaches for sending routes to FIBs. Suppose that there are at least three line cards inside a router for redundancy to act as one line card (called a line card box for differentiating it from a line card inside the router) from a peer router's point of view. For example, there are three line cards in FIG. 8: PL (Primary Line card) 832, SL (Secondary Line Card) 834, and TL (Third Line card) 836 inside a router for high availability to act as a single line card (i.e., a line card box) from a peer router's point of view.

In various embodiments, ECP 808 on PB sends routes to FIB on every line card 832, 834, 836 (e.g., FIB on PL, FIB on SL, and FIB on TL) in every line card box. This approach is called one to many, or 1 to n for short. ECP 808, 818, 828 on every board (e.g., ECP on PB, ECP on SB, and ECP on TB) sends routes to FIB on every line card 832, 834, 836 in every line card box. This approach is called many to many, or n to n for short.

Figure 9:
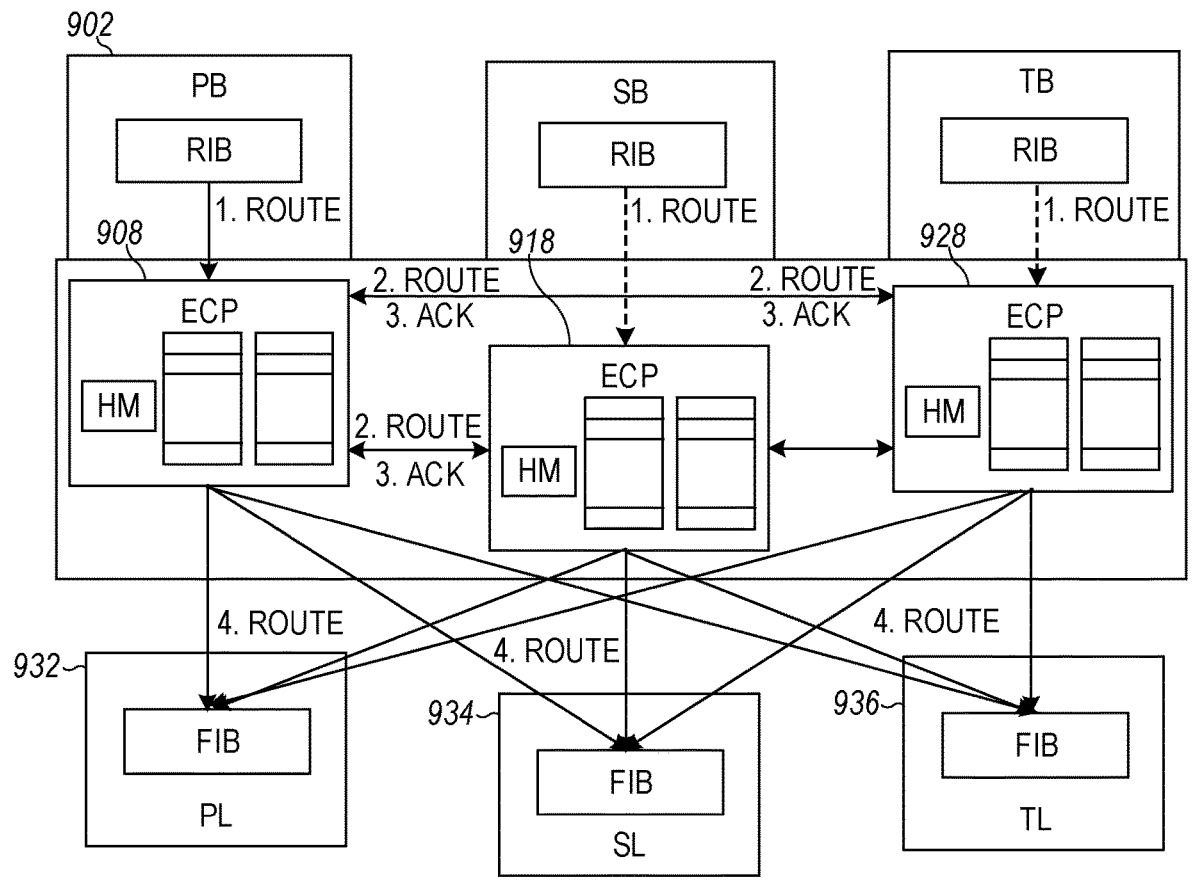
FIG. 9 is a block diagram illustrating multiple routing information base (RIB) to forwarding information base (FIB) route synchronization in a system for an elastic consistency platform for high availability, according to various embodiments.

FIG. 9 is a block diagram illustrating multiple routing information base (RIB) to forwarding information base (FIB) route synchronization in a system for an elastic consistency platform for high availability, according to various embodiments. For the N to N approach, a line card needs to be upgraded to receive and process routes from every board (e.g., PB, SB, and TB). Routes may be stored separately for each board and checked for consistency among routes from different boards. Some variants of the N to N approach include: Primary Route to FIB, where each ECP sends routes from ECP on PB to FIBs; and Individual Route to FIB, where ECP on a board sends routes from RIB on the board to FIBs. In the primary route approach, after sending route Prt to ECP on each AB of the other boards 918, 928 (e.g., SB and TB) and receiving Ack for Prt from all the other boards, ECP on PB 908 sends Prt to FIB on every line card 932, 934, 936 (e.g., FIB on PL, FIB on SL, and FIB on TL) in every line card box. After receiving Prt and sending Ack for Prt to ECP on PB 908, ECP 918, 928 on AB sends Prt to FIB on every line card 932, 934, 936 in every line card box. For the individual route approach, after receiving route Prt from RIB on PB 902, ECP on PB 908 sends Prt to ECP 918, 928 on each of the other boards and to FIB on every line card 932, 934, 936 in every line card box. For any board AB other than PB, after receiving route Art from RIB on AB, ECP on AB 918, 928 sends Art to ECP on PB 908 (or ECP on each of the other boards) and to FIB on every line card 932, 934, 936 in every line card box.

ECP on any board AB (e.g., PB, SB, TB) receives RIB routes from RIB on AB and some of the other boards. The ECP may check the consistency of the routes based on the final results of the routes. For a route, the route is identified by its destination (or prefix), and there are a few sets of operations or updates. Each set includes the route updates from the RIB on one board (e.g., PB). If there are three boards PB, SB, and TB, there may be three sets of operations or updates, each of which is from the RIB on one board. One set of operations on the route will generate the same result (or say, final route) as another set of operations on the route. Thus, every set of operations on the route will generate the same result (final route) when the network is stable or converged. If the result generated from the operations on the route from RIB on one board is different from the result generated from the operations on the route from RIB on another board for a period of time, then an inconsistency is found and it is highly probable that there is a problem or bug in RIB. For a route R, which is from RIB and to be stored in FIB, one item for R may be created and stored in a table, tree, or database by ECP on a board. This item may be identified by its destination Dr. Under Dr, there are a few routes, each of which is the result of the operations/updates on the route from the RIB on one board and associated with a time which is the time when the last update is applied on the route. If the results are the same within a given time, then they are consistent and the item may be removed; otherwise, an inconsistency is found and it is highly possible that there is a problem or bug in RIB. For example, suppose that ECP on PB receives RIB route updates from RIB on every board PB, SB, and TB. There are three sets of route updates SP (set of route updates from RIB on PB), SS (set of route updates from RIB on SB), and ST (set of route updates from RIB on TB). For the route R with destination Dr, under the item identified by Dr, there are three routes Rp, Rs, and Rt, which are the results of route updates applied on the route from the RIB on PB, SB, and TB respectively. If Rt with time Tp, Rs with Ts, and Rt with Tt cannot reach a same result for a given time limit (i.e., at time T of checking, the maximum of (T–Tp), (T–Ts) and T–Tt) is greater than the given time limit), then an inconsistency is found; otherwise (they reach the same result within a given time), they are consistent and the item may be removed.

Figure 10:
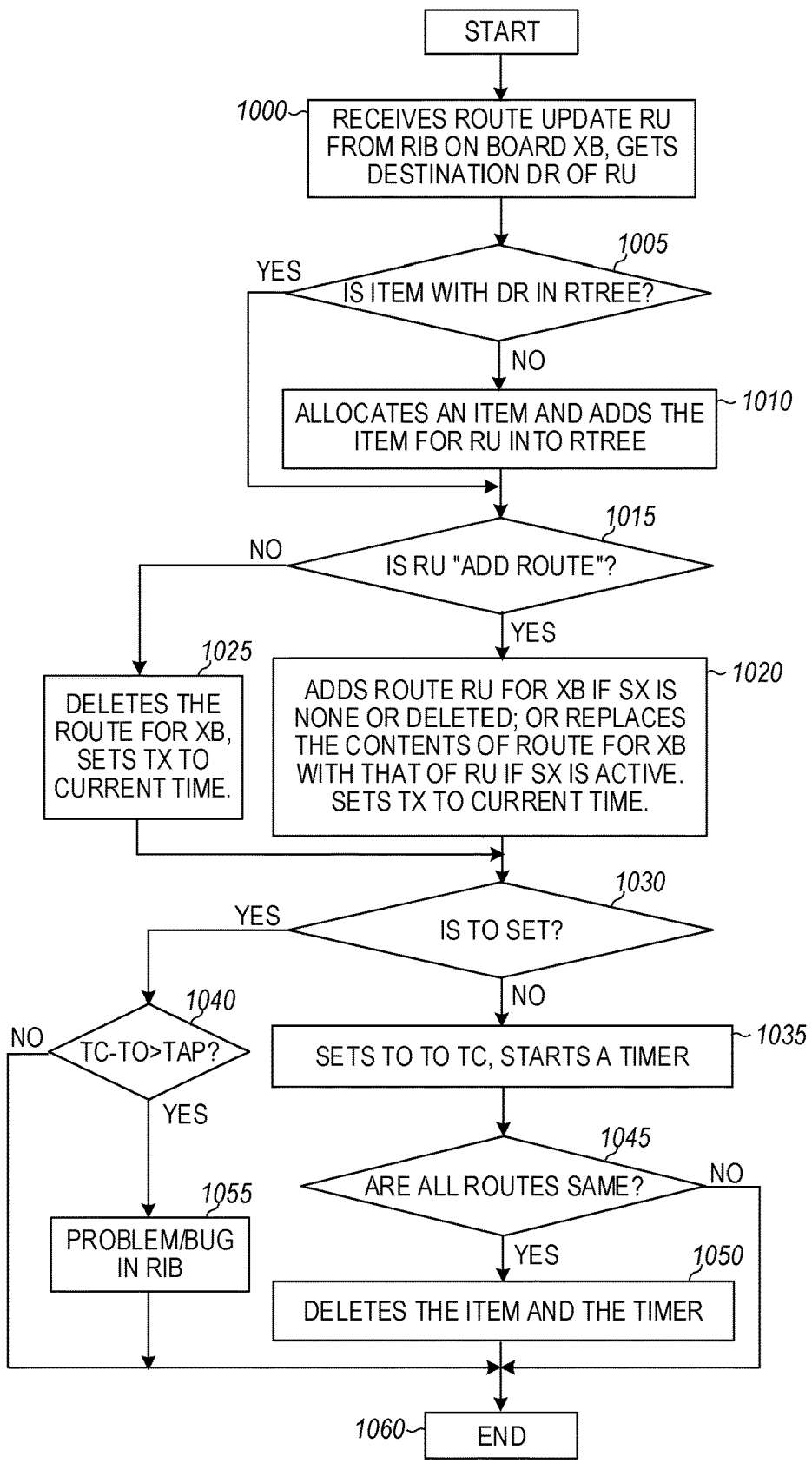
FIG. 10 is a flow diagram illustrating routing information base (RIB) to forwarding information base (FIB) route synchronization, according to various embodiments.

FIG. 10 is a flow diagram illustrating routing information base (RIB) to forwarding information base (FIB) route synchronization, according to various embodiments. The method starts at block 1000, which receives a route update Ru from RIB on a board xB (e.g., xB is PB, SB, or TB), gets the destination Dr of Ru, and then goes to block 1005. At block 1005, the method determines if an item with Dr is in the RTree. If it is not, the method goes to block 1010; if it is, the method goes to block 1015. At block 1010, the method allocates an item, initializes it, adds it into RTree, and then goes to block 1015. At block 1015, the method determines if Ru is "add route". If it is, the method goes to block 1020; if it is not (Ru is "delete route"), the method goes to block 1025. At block 1020, the method adds route R in Ru for xB (xB is PB, SB, or TB) if Sx (Sx is Sp, Ss or St) is none or deleted; or replaces the contents of the route for xB in the item with the contents of Ru if Sx is active. The method sets Tx (Tx is Tp, Ts, or Tt) to current time, Sx to active, and then goes to block 1030. At block 1025, the method deletes the route for xB (xB is PB, SB, or TB), sets Tx to the current time, Sx to deleted, and then goes to block 1030. At block 1030, the method determines if To is set. If it is not, the method goes to block 1035; if it is, the method goes to block 1040. At block 1035, the method sets To to current time (Tc), starts a timer with a given time period Tap, (e.g., 10 seconds) and a callback function for reporting a problem/bug in RIB, and then goes to block 1045. At block 1040, the method checks if the difference between Tc (current time) and To is greater than Tap. If it is, the method goes to block 1055; if it is not, the method goes to block 1060. At block 1045, the method checks if all routes in the item are the same. If they are, the method goes to block 1050; if they are not, the method goes to block 1060. At block 1050, the method deletes the item from RTree and the timer, then goes to block 1060. At block 1055, the method reports a problem/bug in RIB, and goes to block 1060, where the method ends.

Figure 11:
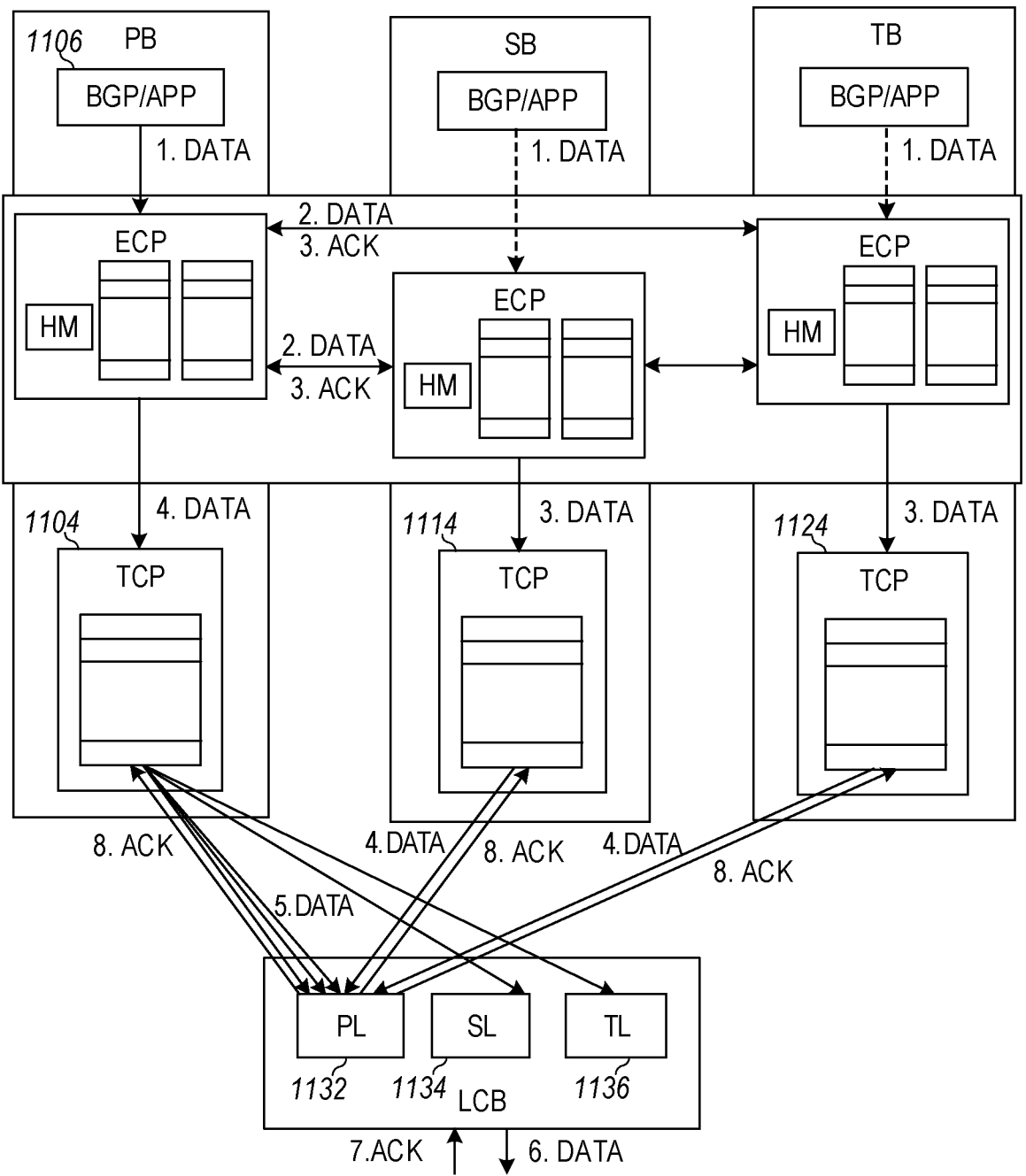
FIG. 11 is a block diagram illustrating routing information base transmission control protocol (TCP) to line card (LC) traffic synchronization in a system for an elastic consistency platform for high availability, according to various embodiments.

FIG. 11 is a block diagram illustrating routing information base transmission control protocol (TCP) to line card (LC) traffic synchronization in a system for an elastic consistency platform for high availability, according to various embodiments. In various embodiments, options for TCP to LC traffic synchronization include: (1) Primary to Primary: only TCP on Primary board (PB) 1104 sends TCP traffic originated in BGP/App on PB 1106 to Primary Line card 1132; (2) Primaries to Primary: TCP on every board 1104, 1114, 1124 sends TCP traffic originated in BGP/App on PB 1106 to Primary Line card 1132; (3) Primary to All: Only TCP on Primary board (PB) 1104 sends TCP traffic originated in BGP/App on PB 1106 to every line card 1132, 1134, 1136 in a line card box; (4) Primaries to All: TCP on every board 1104, 1114, 1124 sends TCP traffic originated in BGP/App on PB 1106 to every line card 1132, 1134, 1136 in a line card box; and (5) Individual to All: TCP on every board 1104, 1114, 1124 sends TCP traffic originated in BGP/App on the board to every line card 1132, 1134, 1136 in a line card box. For each of the options, only PL (Primary Line card) 1132 sends TCP traffic/data to a peer and sends the Ack received from the peer to TCP on every board.

For the second option (Primaries to Primary) and fourth option (Primaries to All), a line card can be upgraded to receive TCP data from every board (i.e., TCP on every board) and store the data in different (output) buffers for different boards, to check the consistency among the data received from all boards, determine an inconsistency of the data and generate a warning when an inconsistency is determined, and to select the data received from one board and send the data to a peer if the line card is the primary line card in a line card box. For every non-primary line card, the data that passes the consistency check is discarded. The primary line card removes the data from its buffers after the data is sent to a peer and passes the consistency check, and a problem/bug warning is issued if an inconsistency is found. For each of the options, every line card knows Primary, Secondary, and Third Board and TCP. The primary line card may select the data from primary board (i.e., TCP on PB) and send the data to a peer, in various embodiments.

In various embodiments, when a line card (LC) receives TCP traffic from TCP on every board, it may check the consistency of the traffic based on the traffic flow from each TCP. For a TCP traffic flow of a TCP session from TCP on a board (e.g., PB), it should be the same as the TCP traffic flow of the same TCP session from TCP on another board (e.g., SB) within a given time limit/period. If all the TCP traffic flows of a TCP session from TCPs on all the boards are the same within a given time limit/period, they are consistent; otherwise, they are not consistent, and it is highly likely that there is a problem or bug in TCP. One way for a LC to check the consistency of TCP traffic flows of a TCP session from TCPs on all the boards is to have an output ring buffer for every TCP traffic flow of the session from TCP on every board, store the TCP traffic from the TCP into the buffer, and compare the TCP traffic stored in all output buffers. Starting from a same point for all the output buffers, the algorithm removes the same continuous data from all the buffers. If there is one output buffer full of data and there is another output buffer without any data, then the TCP traffic flows from TCPs are not consistent, and there is a problem or bug in the TCP.

Figure 12:
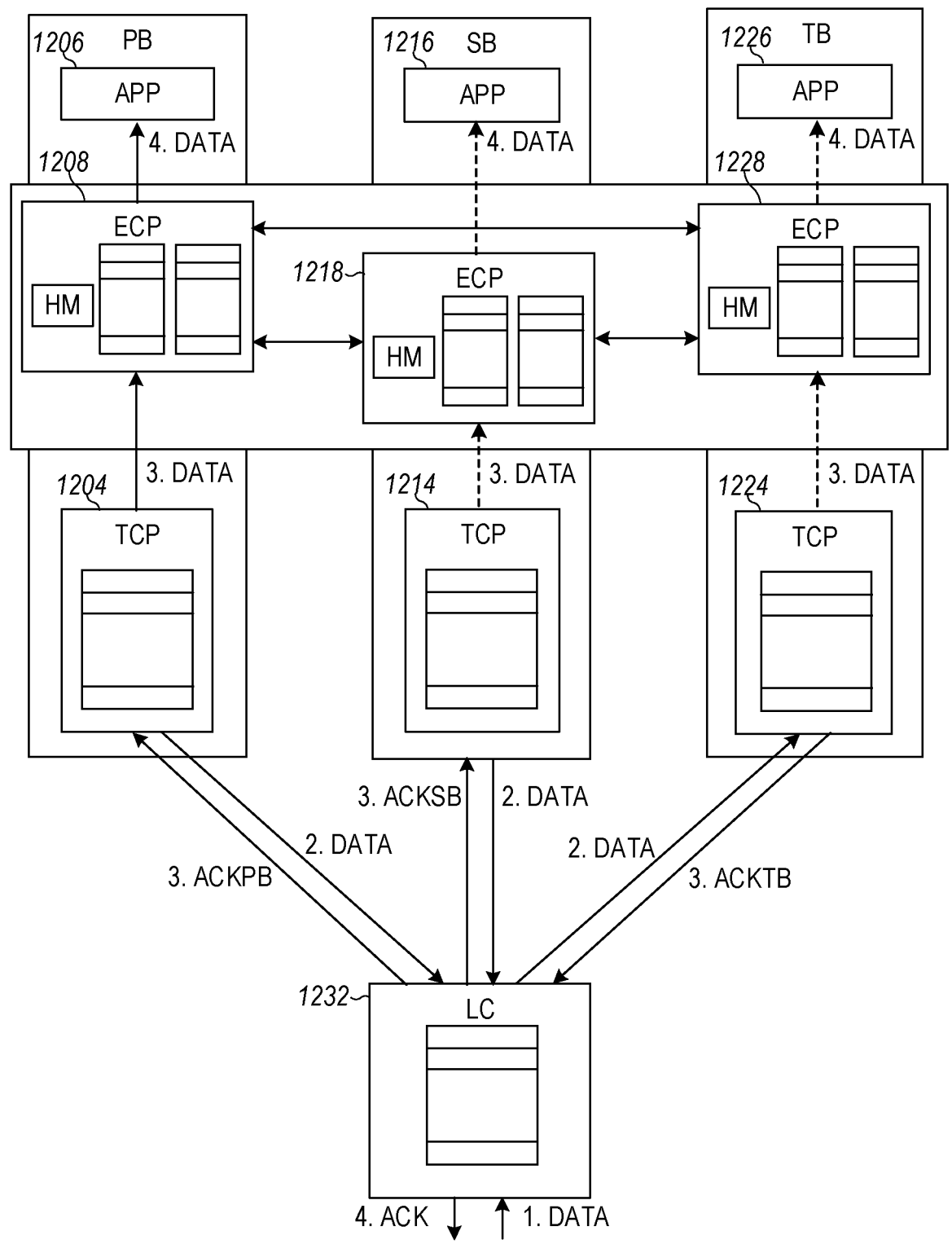
FIG. 12 is a block diagram illustrating incoming transmission control protocol (TCP) traffic in parallel in a system for an elastic consistency platform for high availability, according to various embodiments.

FIG. 12 is a block diagram illustrating incoming transmission control protocol (TCP) traffic in parallel in a system for an elastic consistency platform for high availability, according to various embodiments. In various embodiments, data from TCP on a board is sent to the application on the board in parallel without synchronization. In one example, the LC 1232 receives TCP data from peer and sends the data to TCP 1204, 1214, 1224 on every board. TCP 1204, 1214, 1224 on every board receives the data from LC 1232 and sends an acknowledgement for the data received to LC 1232 and sends the data to its ECP 1208, 1218, 1228. TCP 1204 on PB sends AckPB, TCP 1214 on SB sends AckSB, and TCP 1224 on TB sends AckTB to LC 1232. ECP 1208, 1218, 1228 on each board receives the data from its TCP 1204, 1214, 1224 and sends the data to its application 1206, 1216, 1226. In this example, LC 1232 receives acknowledgements from TCP on every board and sends an Ack to peer, where Ack is min{AckPB, AckSB AckTB}, indicating a minimum data (sequence#) acknowledged by all boards.

If the incoming TCP traffic is sequential, ECP on a board (AB) sends its application the TCP data after ECP on each of the boards behind AB sends its application the data. LC receives TCP Data from peer, and sends TCP data to TCP on every board. TCP on every board receives the TCP data from LC, sends an Acknowledgement for the data received to LC and sends the data to its ECP. ECP on the last board (e.g., TB) sends its application the TCP data after it reads the data from its TCP, and sends ECP on its previous board (e.g., SB) an Ack indicating that the data is sent to the application on each of the boards behind current board (e.g., TB) inclusive. ECP on SB sends its application the TCP data after it reads the data from its TCP and receives the Ack from TB, and then it sends ECP on its previous board (e.g., PB in figure) an Ack indicating that the data is sent to the application on each of the boards behind current board (e.g., SB and TB) inclusive. ECP on PB sends its application the TCP data after it reads the data from its TCP and receives the Ack from SB.

LC receives the Acknowledgement from TCP on every board AckPB, AckSB, and AckTB, sends an Ack to peer, where Ack is min{AckPB, AckSB, AckTB}, indicating minimum data (sequence#) acknowledged by all boards, in various embodiments.

In one example of sequential TCP traffic, TCP on every board receives the data from LC, sends an Ack for the data received to LC and sends the data to its ECP. TCP on PB, SB, and TB sends AckPB, AckSB, and AckTB to LC respectively. ECP on TB receives the data from its TCP and sends the data to its application and an Ack to ECP on SB. ECP on SB receives the data from its TCP, sends the data to its application and an Ack to ECP on PB after receiving the Ack from ECP on TB. ECP on PB sends its application the data after receiving the data from its TCP and the Ack from ECP on SB. LC receives Acks from TCPs and sends an Ack to peer, where Ack is min{AckPB, AckSB, AckTB}, indicating minimum data (sequence#) acknowledged by all boards, in various embodiments.

In various embodiments, the present subject matter provides for insertion of a new board during operation. In one embodiment, after a new board is inserted, a batch backup of an application using TCP is started. While PB (Primary Board) is running, a new board (AB) is inserted. An application on every existing board (EB) stops sending and receiving TCP data. ECP on EB stops sending/receiving TCP data to/from the application and to/from TCP. LC stops sending TCP traffic to TCP on EB. Application in PB backs up its TCP sockets to its corresponding application in AB, in various embodiments. After a TCP socket is created on AB, the state and data structures of socket on PB are replicated in the TCP on AB. The state and data structures of ECP on PB are replicated in ECP on AB. The input and output buffers of the application on PB are replicated in the corresponding application on AB. The other states and data of the application on PB are replicated in the corresponding application on AB, in various embodiments.

In one embodiment, a smooth transition is started after batch backup and before real-time backup of an application using TCP. For an incoming TCP data stream, the application on PB copies the TCP data in its input buffer to the input buffer of the corresponding application on AB. The beginning of the data in the buffer should be the boundary of a packet. ECP on PB copies the TCP data in its input buffer to the input buffer of ECP on AB. TCP on PB copies the TCP data in its input buffer to the input buffer of TCP on AB. TCP on PB sends TCP on AB the sequence number m corresponding to the last byte of the data delivered to ECP on PB just before the holding off. The TCP data in the input buffer of the application, the TCP data in the input buffer of ECP and the TCP data in the input buffer of TCP on AB and the incoming TCP data from peer will form the continuous incoming TCP data stream on AB for the socket backed up from PB. For an outgoing TCP data stream, the application on PB copies the TCP data in its output buffer to the output buffer of the corresponding application on AB. The beginning of the data in the buffer should be the boundary of a packet. ECP on PB copies the TCP data in its output buffer to the output buffer of ECP on AB. TCP on PB copies the TCP data in its output buffer to the output buffer of TCP on AB. TCP on PB sends TCP on AB the sequence number n corresponding to the last byte of the data packet delivered to TCP by ECP on PB just before the holding off. The last byte should be the boundary of the packet, in various embodiments. The TCP data in the output buffer of TCP, the TCP data in the output buffer of ECP, the TCP data in the output buffer of the application, and the outgoing TCP data from the application on AB will form the continuous outgoing TCP data stream on AB for the socket backed up from PB.

Figure 13:
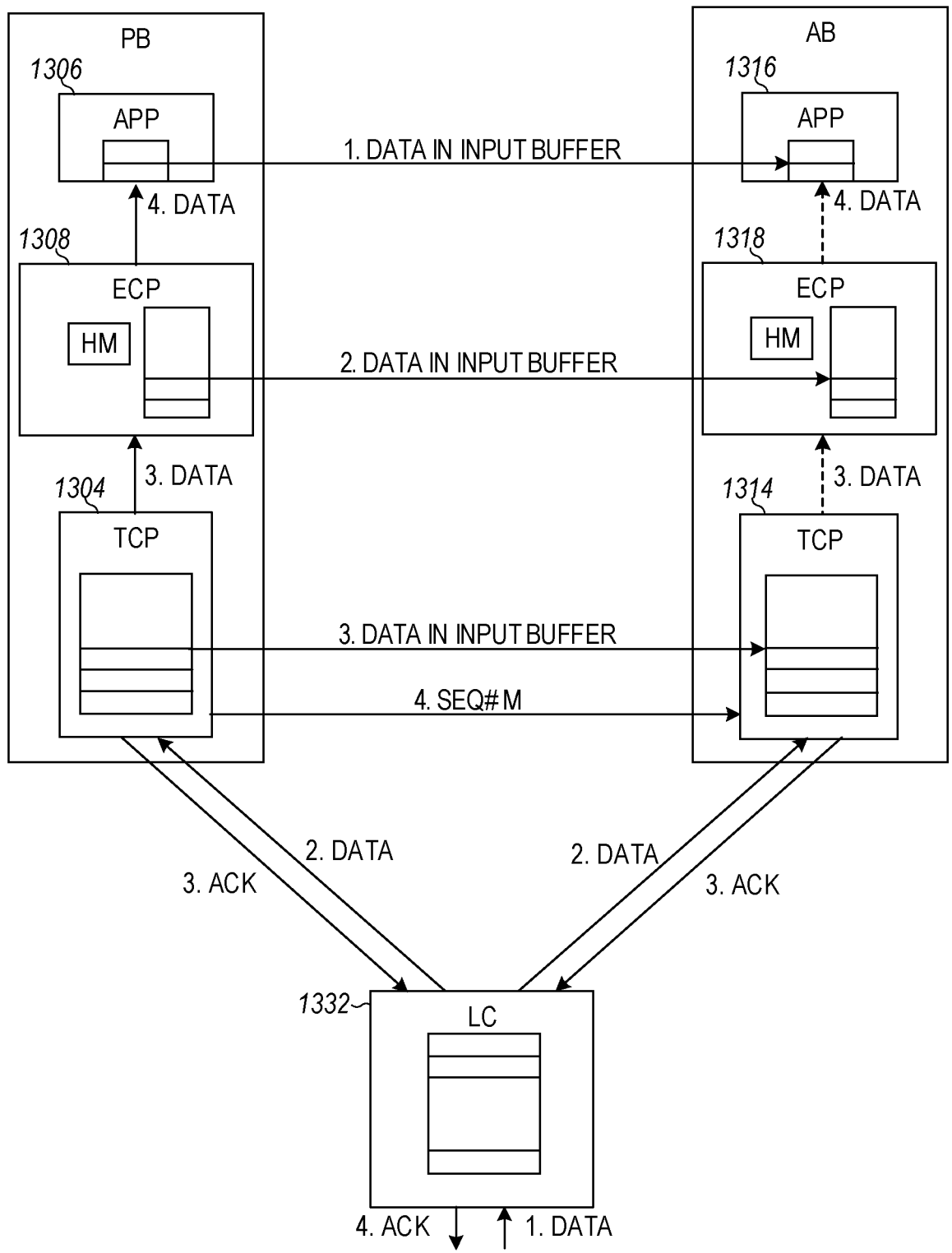
FIG. 13 is a block diagram illustrating an incoming transmission control protocol (TCP) data stream in a system for an elastic consistency platform for high availability, according to various embodiments.

FIG. 13 is a block diagram illustrating an incoming transmission control protocol (TCP) data stream in a system for an elastic consistency platform for high availability, according to various embodiments. In one embodiment, after a new board (AB) is inserted and batch backup is finished but before real-time backup is started, an application on PB 1306 stops sending and receiving TCP data. ECP on PB 1308 stops sending/receiving TCP data to/from the application and to/from TCP on PB 1304. LC 1332 stops sending TCP traffic to TCP on PB 1304. In this embodiment, the application on PB 1306 copies the TCP data in its input buffer to the input buffer of the corresponding application on AB 1316. ECP on PB 1308 copies the TCP data in its input buffer to the input buffer of ECP on AB 1318. TCP on PB 1304 copies the TCP data in its input buffer to the input buffer of TCP on AB 1314. TCP on PB 1304 sends TCP on AB 1314 the sequence number m corresponding to the last byte of the data delivered to ECP on PB 1308 just before the holding off. The TCP data in the input buffer of the application, the TCP data in the input buffer of ECP and the TCP data in the input buffer of TCP on AB, and the incoming TCP data from peer will form the continuous incoming TCP data stream on AB for the socket backed up from PB, in various embodiments. After real-time backup starts, TCP on AB sends the incoming TCP data from peer from sequence number m+1 to the corresponding application on AB via ECP. After switchover to AB, AB becomes PB, TCP on AB continues sending data from peer to application via ECP, TCP on AB sends peer Ack for the data received via LC, in various embodiments.

Figure 14:
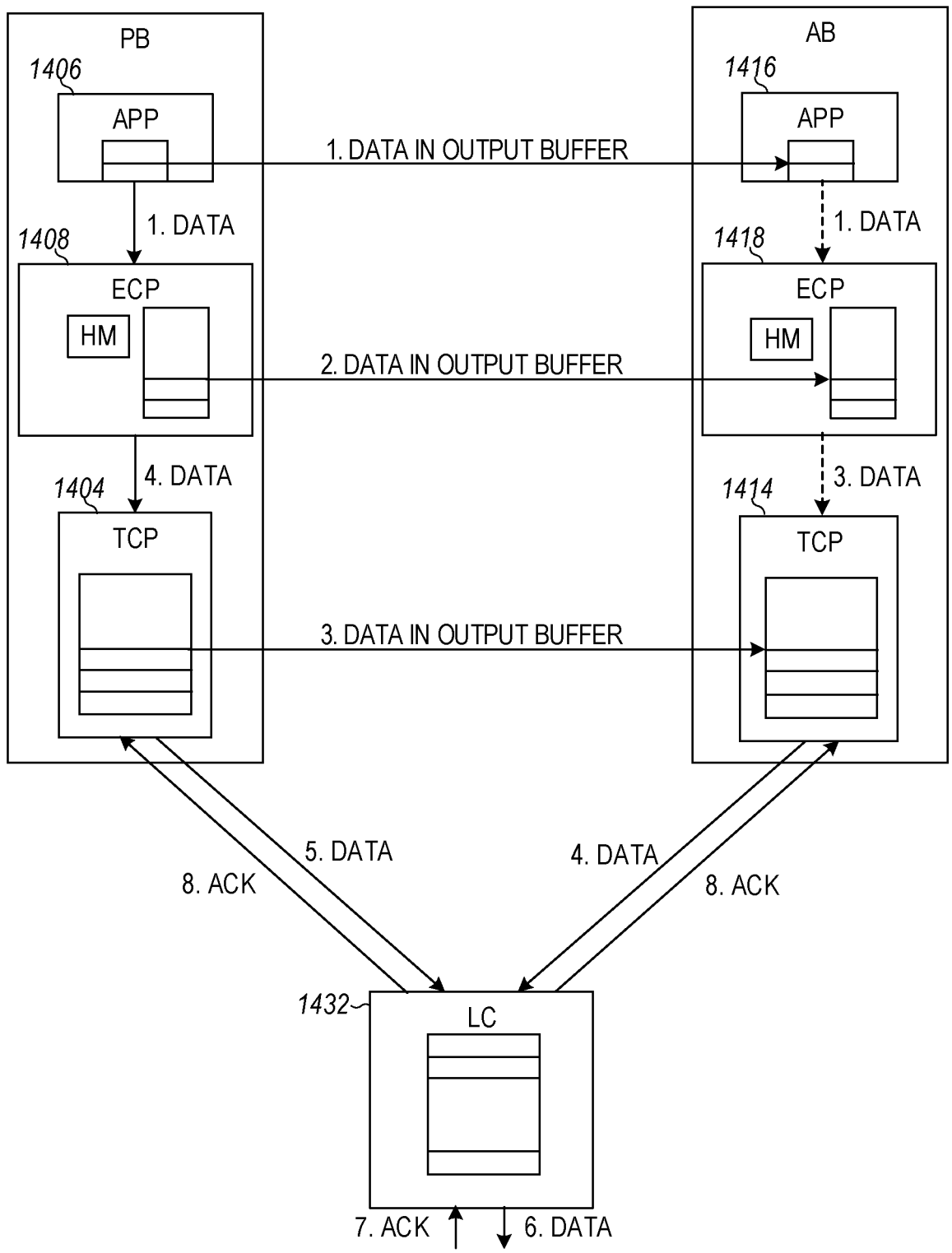
FIG. 14 is a block diagram illustrating an outgoing transmission control protocol (TCP) data stream in a system for an elastic consistency platform for high availability, according to various embodiments.

FIG. 14 is a block diagram illustrating an outgoing transmission control protocol (TCP) data stream in a system for an elastic consistency platform for high availability, according to various embodiments. In one embodiment, after a new board (AB) is inserted and batch backup completes but before real-time backup starts, an application on PB 1406 stops sending and receiving TCP data. ECP on PB 1408 stops sending/receiving TCP data to/from the application and to/from TCP on PB 1404. LC 1432 stops sending TCP traffic to TCP on PB 1404. The application on PB 1406 copies the TCP data in its output buffer to the output buffer of the corresponding application on AB 1416. ECP on PB 1408 copies the TCP data in its output buffer to the output buffer of ECP on AB 1418. TCP on PB 1404 copies the TCP data in its output buffer to the output buffer of TCP on AB 1414. In various embodiments, the TCP data in the output buffer of TCP, the TCP data in the output buffer of ECP, the TCP data in the output buffer of the application, and the outgoing TCP data from the application on AB will form the continuous outgoing TCP data stream on AB for the socket backed up from PB. After real-time backup starts, the system will proceed as described above for outgoing TCP traffic in parallel TCP HA, and after switchover to AB, AB becomes PB as described. Thus, for an incoming TCP data stream, TCP on AB sends the incoming TCP data from peer from sequence number m+1 to the corresponding application on AB via ECP. For an outgoing TCP data stream, ECP on AB receives the outgoing TCP data originated from the application on PB through ECP on PB and sends/writes the data to its TCP. ECP on AB receives the outgoing TCP data originated from the application on AB. For the data received from PB but not received from AB, ECP on AB stores the data in its output buffer, and then removes the data from the buffer after it receives the same data from AB. For the data received from AB but not received from PB, ECP on AB stores the data in its output buffer, and then removes the data from the buffer after it receives the same data from PB, in various embodiments.

Figure 15A:
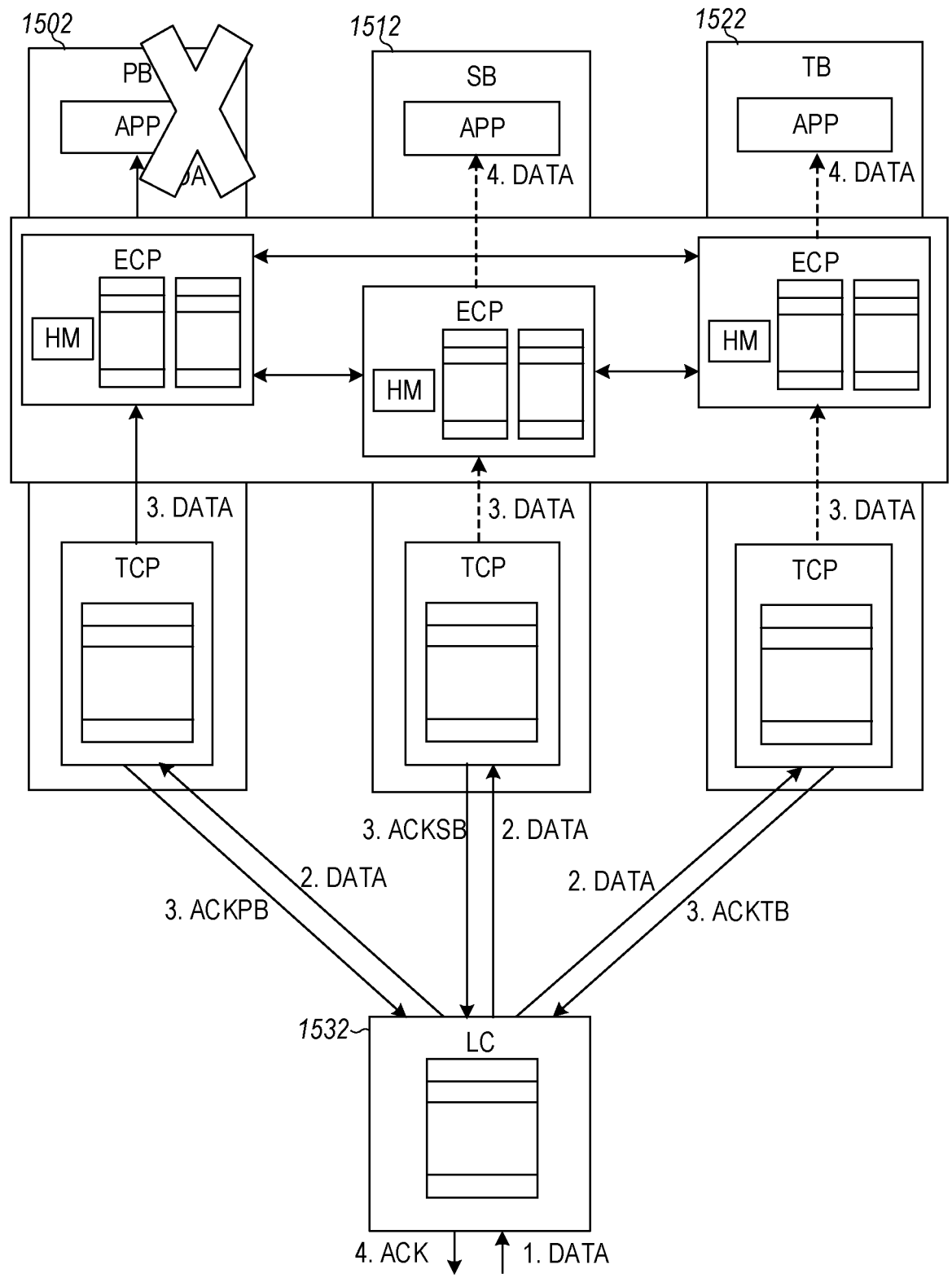
FIGS. 15A-15B are block diagrams illustrating single board removal or failure in a system for an elastic consistency platform for high availability, according to various embodiments.
Figure 15B:
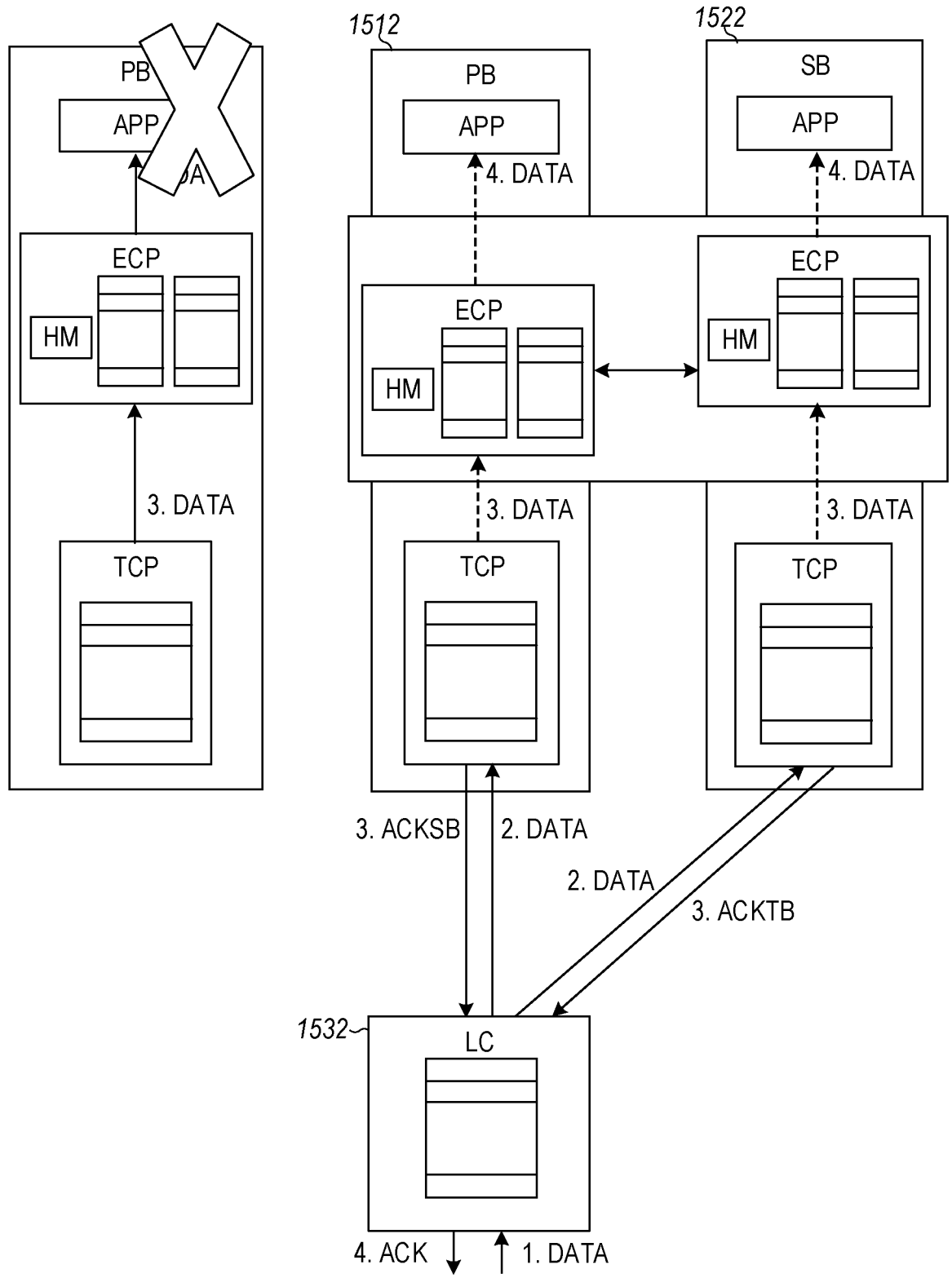

FIGS. 15A-15B are block diagrams illustrating single board removal or failure in a system for an elastic consistency platform for high availability, according to various embodiments. In FIG. 15A, a single board PB 1502 fails or is removed from a system including SB 1512, TB 1522, and LC 1532. In various embodiments, this removal or failure results in the loss of the connection between PB 1502 and SB 1512, the connection between PB 1502 and TB 1522, and the connection between PB 1502 and LC 1532. As shown in FIG. 15B, SB 1512 becomes the new PB, and TB 1522 becomes the new SB, and both communicate with LC 1532. Similar replacement can be done if any one of the three boards is removed or fails, in various embodiments.

Figure 16A:
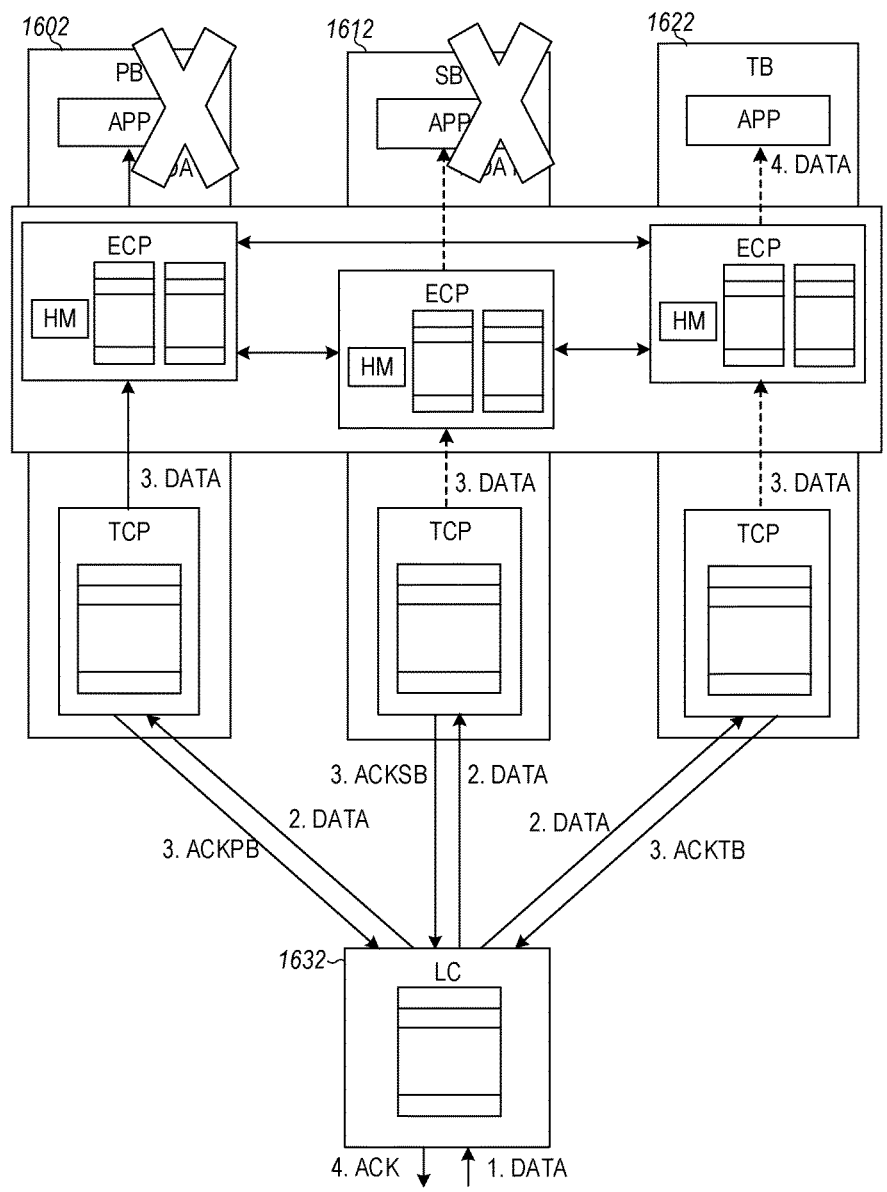
FIGS. 16A-16B are block diagrams illustrating multiple board removal or failure in a system for an elastic consistency platform for high availability, according to various embodiments.
Figure 16B:
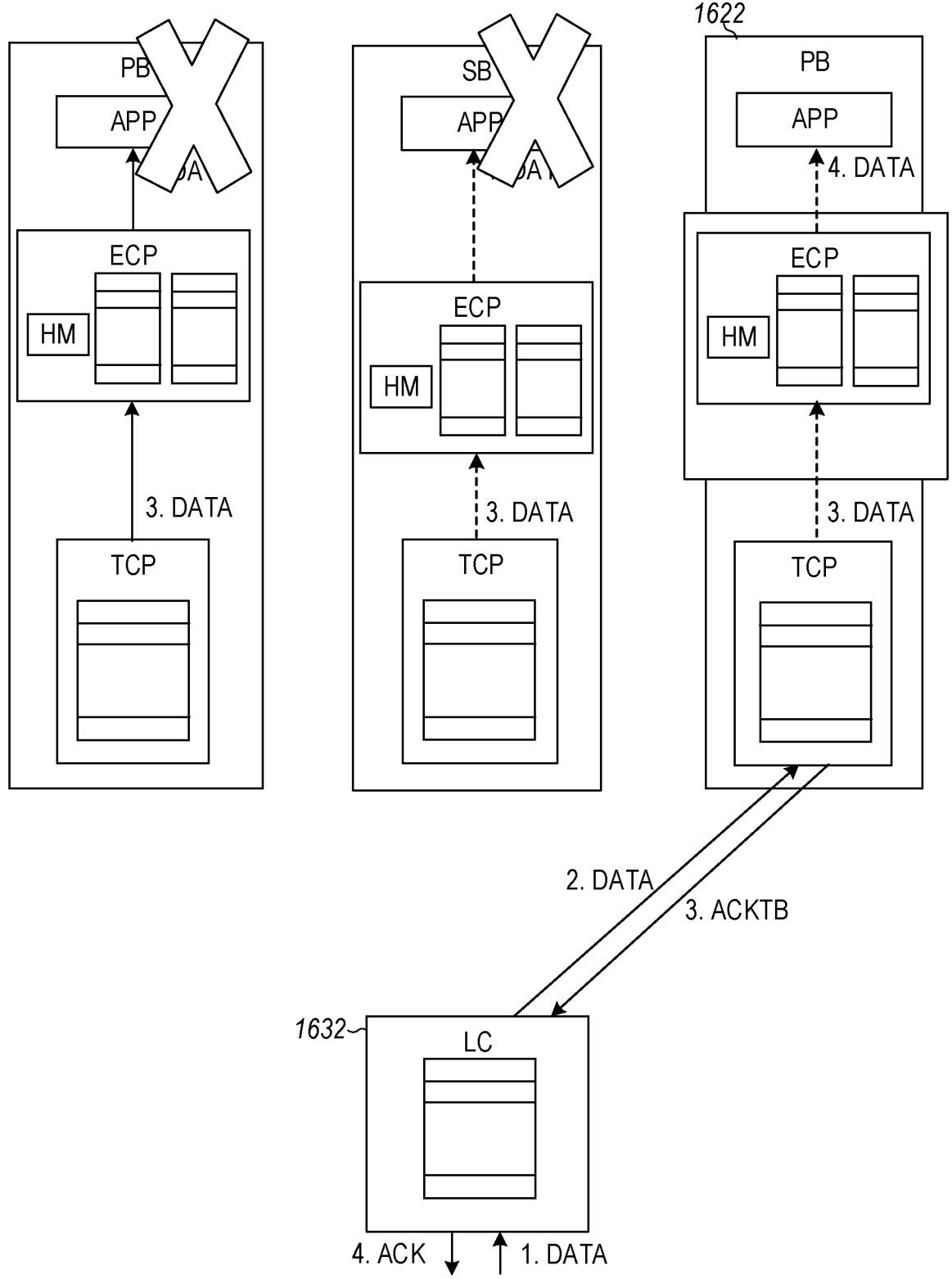

FIGS. 16A-16B are block diagrams illustrating multiple board removal or failure in a system for an elastic consistency platform for high availability, according to various embodiments. In FIG. 16A, two boards PB 1602 and SB 1612 fail or are removed from a system including TB 1622 and LC 1632. In various embodiments, this removal or failure results in the loss of the connection between PB 1602 and TB 1622, the connection between SB 1612 and TB 1622, and the connections among PB 1602, SB 1612, and LC 1632. As shown in FIG. 16B, TB 1622 becomes the new PB, and communicates with LC 1632. Similar replacement can be done if any two of the three boards is removed or fails, in various embodiments.

Figure 17:
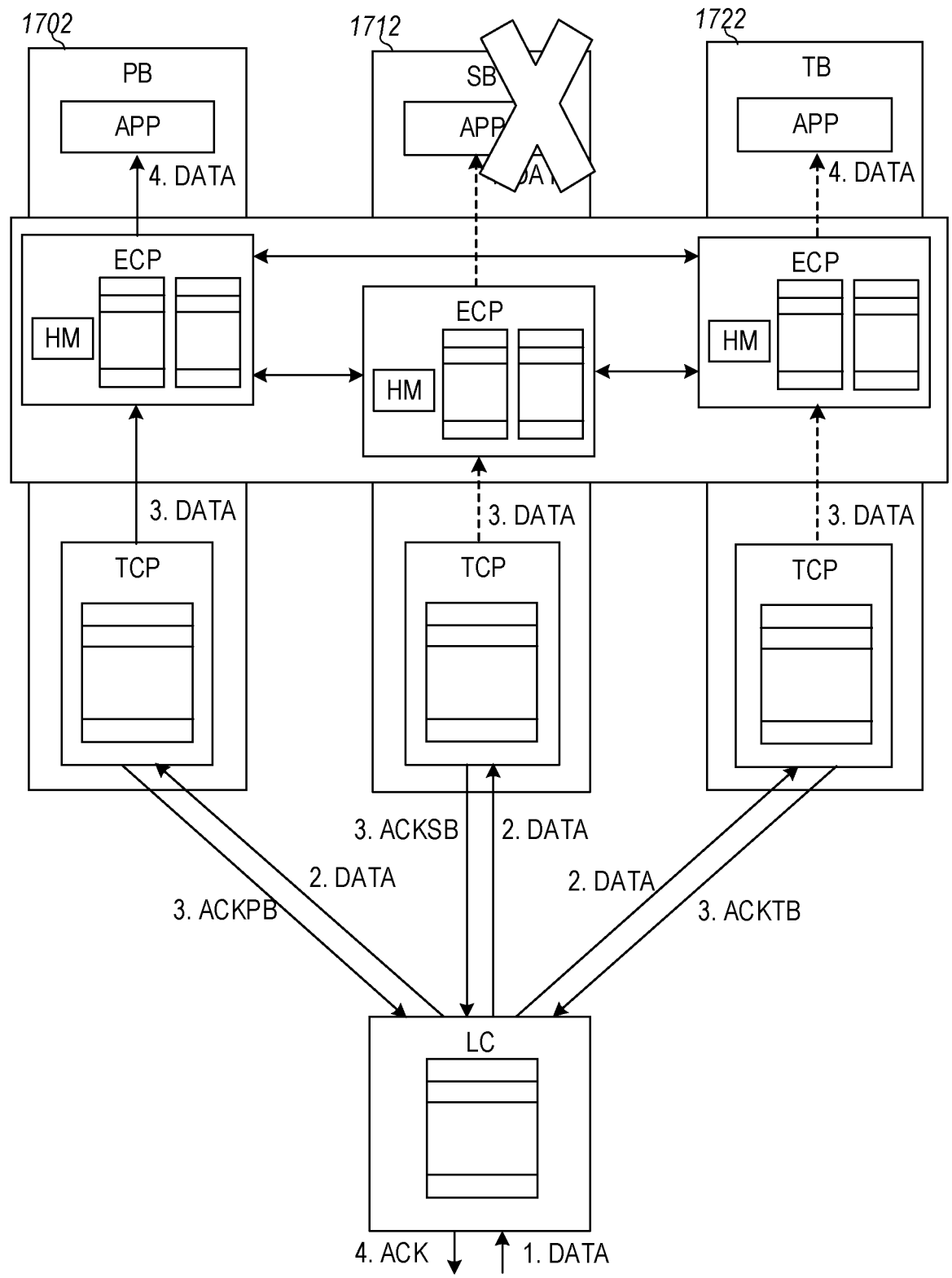
FIG. 17 is a block diagram illustrating a cold hard change example in a system for an elastic consistency platform for high availability, according to various embodiments.

FIG. 17 is a block diagram illustrating a cold hard change example in a system for an elastic consistency platform for high availability, according to various embodiments. In one example of changing order of the boards, there is a sequence of boards, which is ordered as: PB (i.e., B1), SB (i.e., B2), TB (i.e., B3), 84, etc. Changes of order of boards mean that as roles of some boards in the sequence are changed, their positions in the sequence can be changed. One change of order includes a cold hard change, including removing (i.e., bringing down) boards and appending them to the sequence. In one example, for PB 1702, SB 1712, and TB 1722 running in a router, if old TB 1722 is promoted to new PB, and old PB 1702 is changed to new TB, then this can be achieved by removing SB 1712 and appending it such that the order is PB 1702, SB' 1722, TB' 1712, and then removing PB 1702 and appending it such that the resulting order is PB' 1722, SB 1712, TB' 1702. Thus, the present subject matter uses a static method for cold hard changes, including creating an array for possible changes on order of boards, and actions to make changes. For example, below is the array for three boards PB(B1), SB(B2) and TB(B3). In various embodiments, the present system take the actions for a change of order of boards according to the array.

| Current Order | PB(B1), SB(B2), TB(B3) | (Actions Below) |
|---|---|---|
| New Order 1 | PB(B1), SB(B3), TB(B2) | Remove SB(B2), Append B2 at end |
| New Order 2 | PB(B2), SB(B1), TB(B3) | Remove PB(B1), Append B1 at end<br>Remove SB(B3), Append B3 at end |
| New Order 3 | PB(B2), SB(B3), TB(B1) | Remove PB(B1), Append B1 at end |
| New Order 4 | PB(B3), SB(B1), TB(B2) | Remove PB(B1), Append B1 at end<br>Remove PB(B2), Append B2 at end |
| Current Order | PB(B1), SB(B2), TB(B3) | (Actions Below) |
| New Order 5 | PB(B3), SB(B2), TB(B1) | Remove SB(B2), Append B2 at end<br>Remove PB(B1), Append B1 at end |

Figure 18:
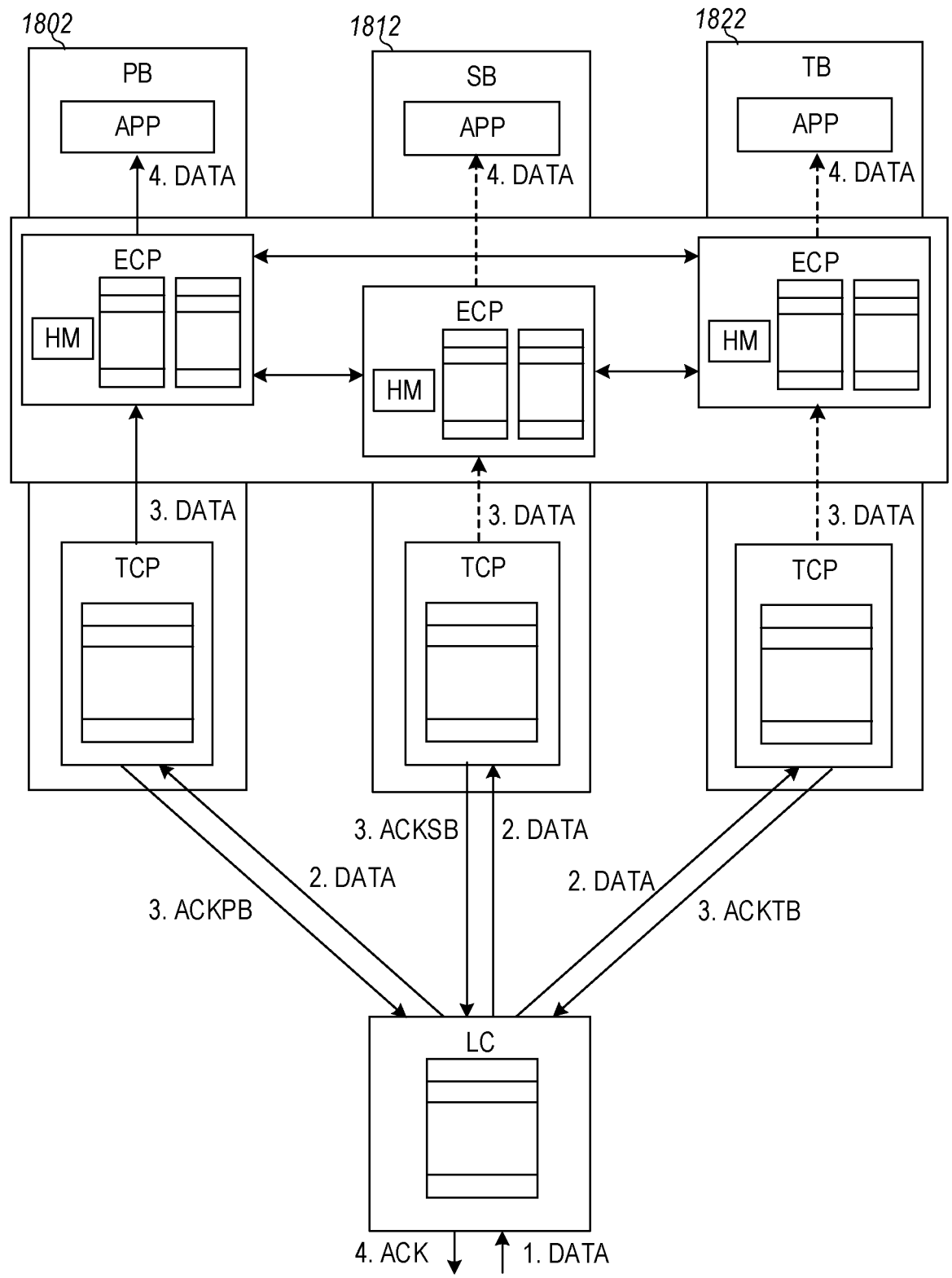
FIG. 18 is a block diagram illustrating a hot soft change example in a system for an elastic consistency platform for high availability, according to various embodiments.

FIG. 18 is a block diagram illustrating a hot soft change example in a system for an elastic consistency platform for high availability, according to various embodiments. For a hot soft change, all boards are frozen and boards are moved to their expected positions in the sequence, and then all boards are unfrozen. In one example, there is an existing sequence of boards, which is ordered as: PB 1802 (i.e., B1), SB 1812 (i.e., B2), TB 1822 (i.e., B3), B4, etc., and the existing sequence is changed to a new sequence of boards as follows: PB (i.e., B1'), SB (i.e., B2'), TB (i.e., B3'), B4', etc. In various embodiments, all boards are frozen while allowing ECP on every board to finish incoming and outgoing TCP data synchronization. For sequential TCP HA, for every board Bi' in the new sequence, if its previous board B(i−1)' is different from the one in the existing sequence, then the existing connection between ECP on Bi' and ECP on B(i−1) is removed and a new connection between ECP on Bi' and ECP on B(i−1)' is created. If its next board B(i+1)' is different from the one in the existing sequence, then the existing connection between ECP on Bi' and B(i+1) is removed and a new connection between Bi' and B(i+1)' is created. After this is completed, all boards are unfrozen such that each board works according to its new role and every line card works based on the new sequence of boards. In various embodiments, freezing all the boards means an application on every existing board (EB) stops sending and receiving TCP data, ECP on EB stops sending/receiving TCP data to/from the application, ECP on EB stops sending/receiving TCP data to/from TCP, and LC stops sending TCP traffic to TCP on EB from peer. Unfreezing all the boards means an application on every existing board (EB) sends and receives TCP data as normal, ECP on EB receives TCP data from the application and sends the data to TCP, ECP on EB receives data from its TCP and sends the data to the application on EB, and LC sends TCP traffic to TCP on EB from peer, according to various embodiments.

Figure 19:
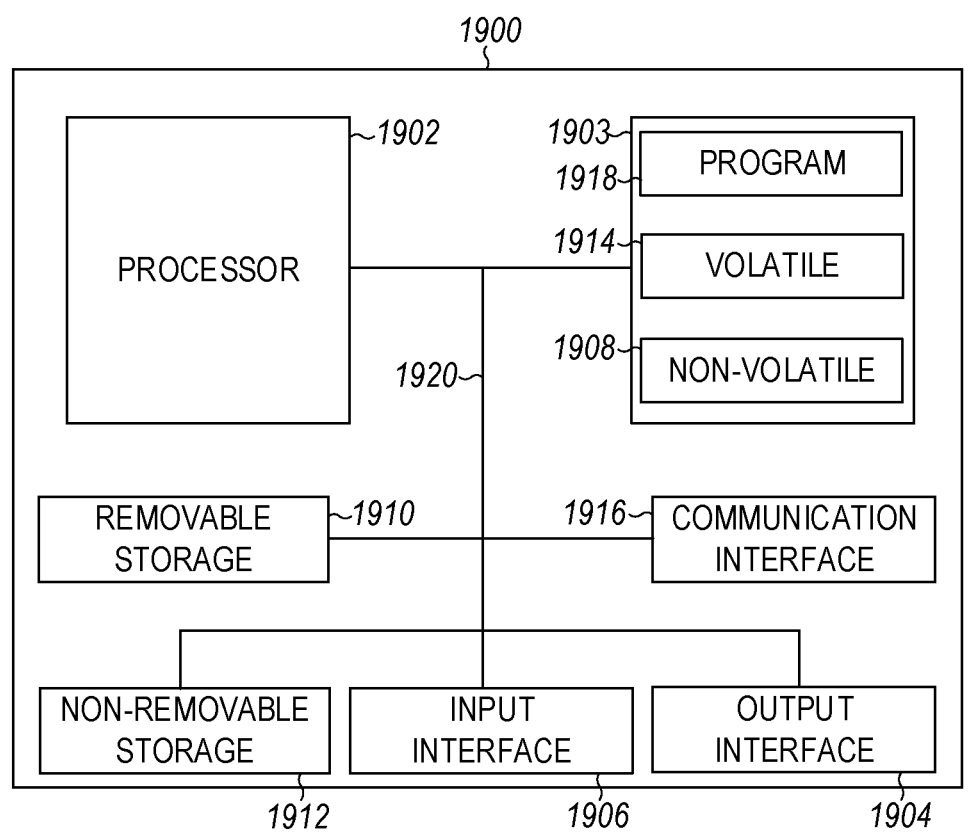
FIG. 19 is a block diagram illustrating circuitry for clients, servers, and cloud-based resources for implementing algorithms and performing methods, according to example embodiments.

FIG. 19 is a block diagram illustrating circuitry for performing methods according to example embodiments. All components need not be used in various embodiments. For example, different routers may each use a different set of components.

One example, a computing device in the form of a computer 1900, may include a processing unit 1902, memory 1903, removable storage 1910, and non-removable storage 1912. Although the example computing device is illustrated and described as computer 1900, the computing device may be in different forms in different embodiments. For example, the computing device may instead be a smartphone, a tablet, smartwatch, or other computing device including the same or similar elements as illustrated and described with regard to FIG. 19. Devices, such as smartphones, tablets, and smartwatches, are generally collectively referred to as mobile devices or user equipment. Further, although the various data storage elements are illustrated as part of the computer 1900, the storage may also or alternatively include cloud-based storage accessible via a network, such as the Internet or server-based storage.

Memory 1903 may include volatile memory 1914 and non-volatile memory 1908. Computer 1900 may include—or have access to a computing environment that includes—a variety of computer-readable media, such as volatile memory 1914 and non-volatile memory 1908, removable storage 1910, and non-removable storage 1912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1900 may include or have access to a computing environment that includes input interface 1906, output interface 1904, and a communication interface 1916. Output interface 1904 may include a display device, such as a touchscreen, that also may serve as an input device. The input interface 1906 may include one or more of a touchscreen, touchpad, mouse, keyboard, camera, one or more device-specific buttons, one or more sensors integrated within or coupled via wired or wireless data connections to the computer 1900, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1900 are connected with a system bus 1920. Computer-readable instructions stored on a computer-readable medium are executable by the processing unit 1902 of the computer 1900, such as a program 1918. The program 1918 in some embodiments comprises software that, when executed by the processing unit 1902, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). The computer program 1918 may be used to cause the processing unit 1902 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following statements are potential claims that may be converted to claims in a future application. No modification of the following statements should be allowed to affect the interpretation of claims which may be drafted when this provisional application is converted into a regular utility application.

What is claimed is:

1. A system comprising:
   a primary board having circuitry for executing a primary application and a transmission control protocol (TCP) module, the primary board including a first elastic consistency platform (ECP) of high availability (HA) electrically coupled between the TCP module and the primary application using the TCP module, the first ECP including a first input buffer and a first output buffer;
   a secondary board having circuitry for executing a secondary copy of the primary application and a secondary TCP module, the secondary board including a second ECP of HA between the secondary TCP module and the secondary copy of the primary application, the second ECP including a second input buffer and a second output buffer;
   a third board having circuitry for executing a third copy of the primary application and a third TCP module, the third board including a third ECP of HA between the third TCP module and the third copy of the primary application, the third ECP including a third input buffer and a third output buffer; and
   a plurality of line cards each coupled to the primary board, the secondary board, and the third board,
   wherein each of the first ECP, the second ECP and the third ECP include one or more processors configured to generate a warning when an amount of inconsistent data in any of the first output buffer, the second output buffer and the third output buffer reaches a programmable limit, and wherein each of the one or more processors is programmed to check for consistency of TCP data in parallel using a data tree including a time of a route update for a route of TCP data, a status for the route, and contents of the route for each destination and derived from route updates on each of the boards.

2. The system of claim 1, wherein the first ECP on the primary board includes an HA method module configured to connect to the secondary board and the third board.

3. The system of claim 1, wherein the second ECP on the secondary board includes an HA method module configured to connect to the primary board and the third board.

4. The system of claim 1, wherein the third ECP on the third board includes an HA method module configured to connect to the primary board and the secondary board.

5. The system of claim 1, wherein the first ECP on the primary board receives inputs from the second ECP on the secondary board and the third ECP on the third board, and wherein the first ECP on the primary board checks consistency among the inputs and generates a warning when an inconsistency is found.

6. The system of claim 1, wherein the second ECP on the secondary board receives inputs from the first ECP on the primary board and the third ECP on the third board, and wherein the second ECP on the secondary board checks consistency among the inputs and generates a warning when an inconsistency is found.

7. The system of claim 1, wherein the third ECP on the third board receives inputs from the second ECP on the secondary board and the first ECP on the primary board, and wherein the third ECP on the third board checks consistency among the inputs and generates a warning when an inconsistency is found.

8. The system of claim 1, wherein at least one of the first ECP on the primary board, the second ECP on the secondary board, and the third ECP on the third board checks consistency by comparing a type of TCP data received in parallel from at least one board and other boards.

9. The system of claim 8, wherein the at least one ECP is configured to generate a warning if the type of TCP data received from a board is not received from one of the other boards for a programmable time.

10. The system of claim 8, wherein the at least one of the ECP checks consistency by comparing sets of routes generated from an update type of TCP data received from the at least one board and other boards.

11. The system of claim 10, wherein the at least one ECP is configured to generate a warning if a route in the sets of routes generated from an update type of TCP data received from a board is not generated from the update type of TCP data received from one of the other boards for a programmable time.

12. The system of claim 1, wherein the first ECP on the primary board sends routes to the line card coupled to each of the primary board, the secondary board, and the third board.

13. A method of protecting against two or more board failures at the same time by using an elastic consistency platform (ECP) of high availability (HA) in multiple board environments, comprising:
using one or more processors of the ECP electrically coupled between a transmission control protocol (TCP) module and an application using TCP on each board of a plurality of boards to generate a warning when an amount of inconsistent data in an output buffer of the ECP on any board of the plurality of boards reaches a programmable limit, wherein each of the one or more processors is programmed to check for consistency of TCP data in parallel using a data tree including a time of a route update for a route of TCP data, a status for the route, and contents of the route for each destination and derived from route updates on each board.

14. The method of claim 13, wherein ECP on a primary board receives inputs from ECP on a secondary board and ECP on a third board, and wherein the ECP on the primary board checks consistency among inputs and generates a warning when an inconsistency is found.

15. The method of claim 14, wherein the ECP on the secondary board receives inputs from the ECP on the primary board and the ECP on the third board, and wherein the ECP on the secondary board checks consistency among the inputs and generates a warning when an inconsistency is found.

16. The method of claim 14, wherein the ECP on the third board receives inputs from the ECP on the secondary board and the ECP on the primary board, and wherein the ECP on the third board checks consistency among the inputs and generates a warning when an inconsistency is found.

17. A method, comprising:
coupling a primary board having circuitry for executing a primary application and a transmission control protocol (TCP) module, a secondary board having circuitry for executing a secondary copy of the primary application and a secondary TCP module, a third board having circuitry for executing a third copy of the primary application and a third TCP module, and a plurality of line cards in series to transfer data and acknowledgments among the primary, secondary and third boards sequentially via their respective TCP modules, wherein each board is connected to the plurality of line cards;
using one or more processors of an elastic consistency platform (ECP) of high availability (HA) electrically coupled between the TCP module and an application using TCP on each of the first, second and third boards to generate a warning when an amount of inconsistent data in an output buffer of the ECP on any board reaches a programmable limit, wherein each of the one or more processors is programmed to check for consistency of TCP data in parallel using a data tree including a time of a route update for a route of TCP data, a status for the route, and contents of the route for each destination and derived from route updates on each of the boards.

18. The method of claim 17, wherein the ECP on the primary board includes an HA method module configured to connect to the secondary board.

19. The method of claim 17, wherein the ECP on the secondary board includes an HA method module configured to connect to the primary board and the third board.

20. The method of claim 17, wherein the ECP on the third board includes an HA method module configured to connect to the secondary board.

* * * * *

UNITED STATES PATENT AND TRADEMARK OFFICE
CERTIFICATE OF CORRECTION

| | |
|---|---|
| PATENT NO. | : 11,042,430 B2 |
| APPLICATION NO. | : 15/899300 |
| DATED | : June 22, 2021 |
| INVENTOR(S) | : Huaimo Chen |

It is certified that error appears in the above-identified patent and that said Letters Patent is hereby corrected as shown below:

In the Claims

In Column 22, Line 20, in Claim 17, after "cards;", insert --and--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*